United States Patent
Malshe et al.

(10) Patent No.: US 10,100,266 B2
(45) Date of Patent: *Oct. 16, 2018

(54) DIELECTRIC NANOLUBRICANT COMPOSITIONS

(71) Applicant: The Board of Trustees of the University of Arkansas, Little Rock, AR (US)

(72) Inventors: Ajay P. Malshe, Springdale, AR (US); Wengyang Zhang, Springdale, AR (US)

(73) Assignee: The Board of Trustees of the University of Arkansas, Little Rock, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/675,231

(22) Filed: Aug. 11, 2017

(65) Prior Publication Data

US 2017/0369813 A1    Dec. 28, 2017

Related U.S. Application Data

(63) Continuation-in-part of application No. 14/816,546, filed on Aug. 3, 2015, now Pat. No. 9,868,920, which
(Continued)

(51) Int. Cl.
*C10M 171/06* (2006.01)
*C10M 169/04* (2006.01)
(Continued)

(52) U.S. Cl.
CPC ........... *C10M 169/04* (2013.01); *B05D 3/007* (2013.01); *C09D 7/61* (2018.01); *C10M 125/22* (2013.01);
(Continued)

(58) Field of Classification Search
CPC .... C10M 2209/104; C10M 2209/1045; C10M 2209/108; C10M 2209/1085;
(Continued)

(56) References Cited

U.S. PATENT DOCUMENTS 3,883,314 A    5/1975  Schnyder et al.
4,105,571 A    8/1978  Shaub et al.
(Continued)

FOREIGN PATENT DOCUMENTS

CN    1080648    1/1994
EP    1980609    10/2008
(Continued)

OTHER PUBLICATIONS

Bakunin, V.N. et al., "Synthesis and application of inorganic nanoparticles as lubricant components—a review", J. Nanoparticle Res. (2004) 6:273-284.
(Continued)

*Primary Examiner* — Latosha Hines
(74) *Attorney, Agent, or Firm* — Akerman LLP; Stephen C. Glazier

(57) ABSTRACT

A dielectric nanolubricant composition is provided. The dielectric nanolubricant composition includes a nano-engineered lubricant additive dispersed in a base. The nano-engineered lubricant additive may include a plurality of solid lubricant nanostructures having an open-ended architecture and an organic, inorganic, and/or polymeric medium intercalated in the nanostructures and/or encapsulate nanostructures. The base may include a grease or oil such as silicone grease or oil, lithium complex grease, lithium grease, calcium sulfonate grease, silica thickened perfluoropolyether (PFPE) grease or PFPE oil, for example. This dielectric nanolubricant composition provides better corrosion and water resistance, high dielectric strength, longer
(Continued)

material life, more inert chemistries, better surface protection and asperity penetration, no curing, no staining, and environmentally friendly, compared to current products in the market.

30 Claims, 12 Drawing Sheets

Related U.S. Application Data is a continuation of application No. 13/921,640, filed on Jun. 19, 2013, now Pat. No. 9,499,766, which is a continuation of application No. 12/160,758, filed as application No. PCT/US2007/060506 on Jan. 12, 2007, now Pat. No. 8,492,319.

(60) Provisional application No. 60/758,307, filed on Jan. 12, 2006.

(51) Int. Cl.
*C10M 177/00* (2006.01)
*B05D 3/00* (2006.01)
*C10M 125/22* (2006.01)
*C09D 7/61* (2018.01)

(52) U.S. Cl.
CPC ...... *C10M 169/042* (2013.01); *C10M 171/06* (2013.01); *C10M 177/00* (2013.01); *C10M 2201/04* (2013.01); *C10M 2201/041* (2013.01); *C10M 2201/042* (2013.01); *C10M 2201/06* (2013.01); *C10M 2201/061* (2013.01); *C10M 2201/062* (2013.01); *C10M 2201/065* (2013.01); *C10M 2201/066* (2013.01); *C10M 2201/0663* (2013.01); *C10M 2201/081* (2013.01); *C10M 2201/082* (2013.01); *C10M 2201/084* (2013.01); *C10M 2201/087* (2013.01); *C10M 2201/103* (2013.01); *C10M 2203/0206* (2013.01); *C10M 2203/1006* (2013.01); *C10M 2203/1025* (2013.01); *C10M 2205/163* (2013.01); *C10M 2207/0406* (2013.01); *C10M 2207/1285* (2013.01); *C10M 2207/2815* (2013.01); *C10M 2207/2835* (2013.01); *C10M 2207/2895* (2013.01); *C10M 2207/401* (2013.01); *C10M 2213/046* (2013.01); *C10M 2213/062* (2013.01); *C10M 2215/0813* (2013.01); *C10M 2223/10* (2013.01); *C10M 2223/103* (2013.01); *C10M 2229/025* (2013.01); *C10N 2210/02* (2013.01); *C10N 2210/03* (2013.01); *C10N 2210/04* (2013.01); *C10N 2210/08* (2013.01); *C10N 2220/082* (2013.01); *C10N 2230/06* (2013.01); *C10N 2230/56* (2013.01); *C10N 2250/10* (2013.01); *C10N 2250/14* (2013.01); *C10N 2270/00* (2013.01); *Y10T 428/2982* (2015.01)

(58) Field of Classification Search
CPC ...... C10M 2201/081; C10M 2201/084; C10M 2201/085; C10M 2201/105; C10M 2201/1053; C10M 2205/0285; C10M 2207/1253; C10M 2219/044; C10M 169/04; C10M 177/00; C10M 125/22; C10M 169/042; C10M 171/06; C10M 2201/0663; C10M 2203/1025; C10M 2223/10; C10M 2229/025; C10M 2223/103; C10M 2215/0813; C10M 2213/062; C10M 2213/046; C10M 2207/2835; C10M 2207/401; C10M 2207/2815; C10M 2207/1285; C10M 2207/0406; C10M 2205/163; C10M 2203/1006; C10M 2203/0206; C10M 2201/103; C10M 2201/087; C10M 2201/082; C10M 2201/066; C10M 2201/065; C10M 2201/062; C10M 2201/061; C10M 2201/06; C10M 2201/042; C10M 2201/041; C10M 2201/2895; B05D 3/007; C09D 7/61; C10N 2230/06; C10N 2270/00; C10N 2250/14; C10N 2250/10; C10N 2230/56; C10N 2220/082; C10N 2210/08; C10N 2210/04; C10N 2210/03; C10N 2210/02; Y10T 428/2982

See application file for complete search history.

(56) References Cited

U.S. PATENT DOCUMENTS

| | | |
|---|---|---|
| 4,166,241 A | 9/1979 | Kozima et al. |
| 4,223,958 A | 9/1980 | Gray |
| 4,334,928 A | 6/1982 | Hara et al. |
| 4,715,972 A | 12/1987 | Pacholke |
| 4,745,010 A | 5/1988 | Sarin et al. |
| 4,816,334 A | 3/1989 | Yokoyama et al. |
| 4,877,677 A | 10/1989 | Hirochi et al. |
| 5,129,918 A | 7/1992 | Chattopadhay |
| 5,273,790 A | 12/1993 | Herb et al. |
| 5,286,565 A | 2/1994 | Holzi et al. |
| 5,328,875 A | 7/1994 | Ueda et al. |
| 5,330,854 A | 7/1994 | Singh et al. |
| 5,352,501 A | 10/1994 | Miyamoto et al. |
| 5,383,821 A | 1/1995 | Murakami et al. |
| 5,389,118 A | 2/1995 | Hinterman et al. |
| 5,391,422 A | 2/1995 | Oman et al. |
| 5,407,464 A | 4/1995 | Kaliski |
| 5,441,762 A | 8/1995 | Gray et al. |
| 5,466,642 A | 11/1995 | Tajima et al. |
| 5,478,622 A | 12/1995 | Nakamura et al. |
| 5,500,331 A | 3/1996 | Czekai et al. |
| 5,503,913 A | 4/1996 | Konig et al. |
| 5,523,006 A | 6/1996 | Strumban |
| 5,534,808 A | 7/1996 | Takaki et al. |
| 5,536,577 A | 7/1996 | Murayama et al. |
| 5,614,140 A | 3/1997 | Pinneo |
| 5,671,532 A | 9/1997 | Rao et al. |
| 5,677,060 A | 10/1997 | Terentieya et al. |
| 5,704,556 A | 1/1998 | McLaughlin |
| 5,766,783 A | 6/1998 | Utsumi et al. |
| 5,800,666 A | 9/1998 | Myers et al. |
| 5,830,577 A | 11/1998 | Murayama et al. |
| 5,830,813 A | 11/1998 | Yao et al. |
| 5,834,689 A | 11/1998 | Cook |
| 5,882,777 A | 3/1999 | Kukino et al. |
| 5,889,219 A | 3/1999 | Moriguchi |
| 5,897,751 A | 4/1999 | Makowiecki et al. |
| 5,902,671 A | 5/1999 | Kutscher |
| 5,928,771 A | 7/1999 | DeWald, Jr. et al. |
| 5,945,166 A | 8/1999 | Singh et al. |
| 6,146,645 A | 11/2000 | Deckers et al. |
| 6,183,762 B1 | 2/2001 | Deckers et al. |
| 6,196,910 B1 | 3/2001 | Johnson et al. |
| 6,210,742 B1 | 4/2001 | Deckers et al. |
| 6,217,843 B1 | 4/2001 | Homyonfer et al. |
| 6,258,139 B1 | 7/2001 | Jensen |
| 6,258,237 B1 | 7/2001 | Gal-Or et al. |
| 6,267,989 B1 | 7/2001 | Liversidge |
| 6,372,012 B1 | 4/2002 | Li et al. |
| 6,383,404 B1 | 5/2002 | Sakai et al. |
| 6,395,634 B1 | 5/2002 | Miyamoto |
| 6,410,086 B1 | 6/2002 | Brandon et al. |
| 6,484,826 B1 | 11/2002 | Anderson et al. |
| 6,540,800 B2 | 4/2003 | Sherman et al. |
| 6,544,599 B1 | 4/2003 | Brown et al. |
| 6,548,139 B2 | 4/2003 | Sakai et al. |

(56) References Cited

U.S. PATENT DOCUMENTS

| | | |
|---|---|---|
| 6,548,264 B1 | 4/2003 | Tan et al. |
| 6,607,782 B1 | 8/2003 | Malshe et al. |
| 6,652,967 B2 | 11/2003 | Yadav et al. |
| 6,709,622 B2 | 3/2004 | Billet et al. |
| 6,710,020 B2 | 3/2004 | Tenne et al. |
| 6,878,676 B1 | 4/2005 | Migdal et al. |
| 6,895,855 B2 | 5/2005 | Doll |
| 6,933,049 B2 | 8/2005 | Wan et al. |
| 6,933,263 B2 | 8/2005 | Manka et al. |
| 6,945,699 B2 | 9/2005 | Tibbits |
| 6,951,583 B2 | 10/2005 | Ciere et al. |
| 6,962,895 B2 | 11/2005 | Scharf et al. |
| 6,962,946 B2 | 11/2005 | Brady et al. |
| 6,976,647 B2 | 12/2005 | Reed et al. |
| 7,018,606 B2 | 3/2006 | Tenne et al. |
| 7,018,958 B2 | 3/2006 | Arrowsmith et al. |
| 7,022,653 B2 | 4/2006 | Harley et al. |
| 7,244,498 B2 | 7/2007 | Cook et al. |
| 7,335,245 B2 | 2/2008 | He et al. |
| 7,371,474 B1 | 5/2008 | Liu et al. |
| 7,372,615 B2 | 5/2008 | Chen et al. |
| 7,374,473 B2 | 5/2008 | Kumasaka et al. |
| 7,375,060 B2 | 5/2008 | Kuzmin et al. |
| 7,387,813 B2 | 6/2008 | Kumar et al. |
| 7,410,697 B2 | 8/2008 | Schneider et al. |
| 7,419,941 B2 | 9/2008 | Waynick |
| 7,430,359 B2 | 9/2008 | Chen et al. |
| 7,438,976 B2 | 10/2008 | He et al. |
| 7,449,432 B2 | 11/2008 | Lockwood et al. |
| 7,458,384 B1 | 12/2008 | Seal et al. |
| 7,463,404 B2 | 12/2008 | Chen et al. |
| 7,494,907 B2 | 2/2009 | Brown et al. |
| 7,510,760 B2 | 3/2009 | Malshe et al. |
| 7,524,481 B2 | 4/2009 | Tenne et al. |
| 7,549,938 B2 | 6/2009 | Leighton et al. |
| 7,556,743 B2 | 7/2009 | Furman et al. |
| 7,571,774 B2 | 8/2009 | Shuster et al. |
| 7,580,174 B2 | 8/2009 | Chen et al. |
| 7,594,962 B2 | 9/2009 | Bujard et al. |
| 7,597,950 B1 | 10/2009 | Stellacci et al. |
| 7,614,270 B2 | 11/2009 | Luckey, Jr. et al. |
| 7,616,370 B2 | 11/2009 | Chen et al. |
| 7,641,886 B2 | 1/2010 | Tenne et al. |
| 7,687,112 B2 | 3/2010 | Buehler et al. |
| 7,704,125 B2 | 4/2010 | Roy et al. |
| 7,723,812 B2 | 5/2010 | Chen et al. |
| 7,749,562 B1 | 7/2010 | Lam et al. |
| 7,763,489 B2 | 7/2010 | Chen et al. |
| 7,767,632 B2 | 8/2010 | Esche, Jr. et al. |
| 7,768,366 B1 | 8/2010 | Patton et al. |
| 7,771,821 B2 | 8/2010 | Martin et al. |
| 7,790,658 B2 | 9/2010 | Sawyer et al. |
| 7,803,347 B2 | 9/2010 | Ajiri |
| 7,816,297 B2 | 10/2010 | Lee |
| 7,846,556 B2 | 12/2010 | Erdemir et al. |
| 7,871,533 B1 | 1/2011 | Haiping et al. |
| 7,952,786 B2 | 5/2011 | Chen et al. |
| 7,955,857 B2 | 6/2011 | Bastide et al. |
| 7,959,891 B2 | 6/2011 | Tenne et al. |
| 7,968,505 B2 | 6/2011 | Liu et al. |
| 7,994,105 B2 | 8/2011 | Narayan |
| 7,996,572 B2 | 8/2011 | McGilvray et al. |
| 8,048,526 B2 | 11/2011 | Mizrahi |
| 8,071,160 B2 | 12/2011 | Chinn et al. |
| 8,074,906 B2 | 12/2011 | Talton |
| 8,075,792 B1 | 12/2011 | Branz et al. |
| 8,114,373 B2 | 2/2012 | Jang et al. |
| 8,117,902 B2 | 2/2012 | Santore et al. |
| 8,221,828 B2 | 12/2012 | Chinn et al. |
| 8,322,754 B2 | 12/2012 | Carcagno et al. |
| 8,476,206 B1 | 7/2013 | Malshe |
| 8,486,870 B1 | 7/2013 | Malshe |
| 8,492,319 B2 | 7/2013 | Malshe |
| 9,650,589 B2 | 5/2017 | Malshe et al. |
| 2004/0076572 A1 | 4/2004 | Clere et al. |
| 2005/0002970 A1 | 1/2005 | Ketelson et al. |
| 2005/0065044 A1 | 3/2005 | Migdal et al. |
| 2005/0124504 A1 | 5/2005 | Zhang et al. |
| 2005/0191357 A1 | 9/2005 | Kawashima et al. |
| 2005/0287348 A1 | 12/2005 | Faler |
| 2005/0288192 A1* | 12/2005 | Alexander ........... B01J 13/0065 508/287 |
| 2006/0025515 A1 | 2/2006 | Scaringe et al. |
| 2006/0040832 A1 | 2/2006 | Zhang et al. |
| 2006/0056752 A1 | 3/2006 | Tibbits |
| 2006/0120947 A1 | 6/2006 | Tenne et al. |
| 2006/0258875 A1 | 11/2006 | Reyes et al. |
| 2007/0004602 A1 | 1/2007 | Waynick |
| 2007/0158609 A1 | 7/2007 | Hong et al. |
| 2007/0158610 A1 | 7/2007 | Hong et al. |
| 2007/0262120 A1 | 11/2007 | Coleman et al. |
| 2007/0293405 A1 | 12/2007 | Zhang et al. |
| 2008/0029825 A1 | 2/2008 | Talton |
| 2008/0050450 A1 | 2/2008 | Arnold et al. |
| 2008/0066375 A1 | 3/2008 | Roos et al. |
| 2008/0161213 A1 | 7/2008 | Jao et al. |
| 2008/0234149 A1 | 9/2008 | Malshe et al. |
| 2008/0269086 A1 | 10/2008 | Adhvaryu |
| 2008/0287326 A1 | 11/2008 | Zhang et al. |
| 2009/0014691 A1 | 1/2009 | Kint et al. |
| 2009/0018037 A1 | 1/2009 | Mabuchi et al. |
| 2009/0048129 A1 | 2/2009 | Mabuchi et al. |
| 2009/0053268 A1 | 2/2009 | DePablo et al. |
| 2009/0074522 A1 | 3/2009 | Graham et al. |
| 2009/0118148 A1 | 5/2009 | Martin et al. |
| 2009/0155479 A1 | 6/2009 | Xiao et al. |
| 2009/0169745 A1 | 7/2009 | Nohr et al. |
| 2009/0170733 A1 | 7/2009 | Hwang et al. |
| 2009/0246285 A1 | 10/2009 | Stellacci et al. |
| 2010/0029518 A1 | 2/2010 | Markovitz et al. |
| 2010/0092663 A1 | 4/2010 | Ajiri |
| 2010/0099590 A1 | 4/2010 | Liu |
| 2010/0112073 A1 | 5/2010 | Sabiliov et al. |
| 2010/0204072 A1 | 8/2010 | Kwon et al. |
| 2010/0227782 A1 | 9/2010 | Tenne et al. |
| 2010/0261625 A1 | 10/2010 | Hakamata |
| 2010/0298180 A1 | 11/2010 | Patel et al. |
| 2011/0052934 A1 | 3/2011 | Sugimoto et al. |
| 2011/0118156 A1 | 6/2011 | Ruhle et al. |
| 2011/0136708 A1 | 6/2011 | Mabuchi et al. |
| 2011/0166051 A1 | 7/2011 | Mizrahi et al. |
| 2011/0172132 A1 | 7/2011 | Branson et al. |
| 2011/0206596 A1 | 8/2011 | Tenne et al. |
| 2011/0229580 A1 | 9/2011 | Srivasfava et al. |
| 2011/0237987 A1 | 9/2011 | Du |
| 2011/0244692 A1 | 10/2011 | Jeong et al. |
| 2011/0257054 A1 | 10/2011 | Baran, Jr. et al. |
| 2012/0032543 A1 | 2/2012 | Chakraborty et al. |
| 2014/0024565 A1 | 1/2014 | Malshe et al. |
| 2014/0038862 A1 | 2/2014 | Hague et al. |
| 2014/0212587 A1 | 7/2014 | Malshe |
| 2014/0364348 A1 | 12/2014 | Malshe |
| 2015/0132539 A1 | 5/2015 | Bailey |
| 2015/0361375 A1 | 12/2015 | Malshe |
| 2016/0046886 A1 | 2/2016 | Malshe |

FOREIGN PATENT DOCUMENTS

| | | |
|---|---|---|
| JP | 63040708 | 2/1988 |
| JP | 10130678 A | 5/1998 |
| JP | 10195473 A | 7/1998 |
| JP | 10330779 A | 12/1998 |
| JP | 2002-294272 | 10/2002 |
| JP | 2006-045350 | 2/2006 |
| WO | 95/02025 | 1/1995 |
| WO | 98/24833 | 8/1998 |
| WO | 2005/080648 | 7/2005 |
| WO | WO 2005060648 A2 * | 7/2005 ........... C10M 125/02 |
| WO | 2005/090534 | 9/2005 |
| WO | 2005/060648 | 10/2006 |
| WO | 2006121553 | 11/2006 |
| WO | 2006/134061 | 12/2006 |
| WO | 2006076728 | 12/2006 |

(56) References Cited

FOREIGN PATENT DOCUMENTS

| | | |
|---|---|---|
| WO | 2007/082299 | 7/2007 |
| WO | 2014/008006 | 1/2014 |
| WO | 2014008004 | 1/2014 |

OTHER PUBLICATIONS

Dmytryshyn, S.L., et al., "Synthesis and characterization of vegetable oil derived esters: evaluation for their diesel additive properties", Bioresource Tech. (2004) 92:55-64.
Hsu, S.M., et al., "Boundary lubricating films: formation and lubrication mechanism", Tribology Intl (2005) 38:305-312.
Hu, J.J. et al., "Synthesis and microstructural characterization of inorganic fullerene-like MoS2 and graphite-MoS2 hybrid nanoparticles", J. Mater. Res. (2006) 21(4):1033-1040.
Jiang, W. et al., "Cubic boron nitride (cBN) based nanocomposite coatings on cutting inserts with chip breakers for hard turning applications", Surface & Coatings Technology (2005) 200:1849-1854.
Li, B. et al., "Tribochemistry and antiwear mechanism of organic-inorganic nanoparticles as lubricant additives", Technology Letters (2006) 22(1):79-84.
Malshe, A.P. et al., "Nanostructured coatings for machining and wear-resistant applications" JOM (2002) 28-30.
Menezes, P.L. et al., "Studies on friction and transfer layer: role of surface texture", Tribology Letter (2006) 24(3):265-273.
Minami, I. et al., "Antiwear properties of phosphorous-containing compounds in vegetable oils", Tribology Letter (2002) 13(2):95-101.
Moshkovith, A. et al., "Friction of fullerene-like WS2 nanoparticles; effect of agglomeration", Tribology Letter (2006) 24(3):225-228.
Ozkan et al., "Femtosecond laser-induced periodic structure writing on diamond crystals and microclusters", Applied Physics Letters, vol. 75, No. 23, Dec. 6, 1999, pp. 3716-3718.
Rao, C.N.R. et al., "Inorganic nanotubes", Dalton Trans. (2003) 1-24.
Russell, W.C. et al., "CBN-TiN composite coating using a novel combinatorial method—structure and performance in metal cutting", J. Mfg. Sci. Eng. (2003) 125:431-434.
Spikes, H., The thickness, friction and wear of lubricant files, a PowerPoint presentation given at the SAE Powertrain & Fluid Systems Conference and Exhibition, San Antonio, Texas (Oct. 25, 2005).
Verma, A. et al., "Exploring mechanical synthesis of inorganic nanoparticles of MoS2 lubricant and its composite with organic medium for advanced manufacturing", ISNM (2006) Paper No. 33.
Wu, J.-H. et at., "Bio-inspired surface engineering and tribology of MoS2 overcoated cBN-TiN composite coating", Wear (2006) 261(5-6):592-599.
Yedave, S.N. et al., "Novel composite CBN-TiN coating: synthesis and performance analysis", J. Mfg. Processes (2003) 5(2):154-162.
Spalvins, T. "A review of recent advances in solid film lubrication", J. Vac. Set Technoll A (1987) 5(2):212—Canter, Dr. Neil, "EP nanopartides-based lubricant package", Tribology & Lubrication Technology, Apr. 2009, pp. 12-17219.
Canter, Dr. Neil, "EP nanoparticles-based lubricant package", Tribology & Lubrication Technology, Apr. 2009, pp. 12-17.
Demydov, Ph.D., Dmytro, "Progress Report (2nd Quarter) Advanced Lubrication for Energy Efficiency, Durability and Lower Maintenance Costs of Advanced Naval Components and Systems", NanoMech, LLC, prepared for Office of Naval Research for the period of Feb. 20, 2010-May 19, 2010, 34 pages.
Verma et al., "Tribological Behavior of Deagglomerated Active Inorganic Nanoparticles for Advanced Lubrication", Tribology Transactions, Sep. 1, 2008, 51: pp. 673-678.
Adhvaryu, Dr. Antanu, "Multi-component Nanoparticle Based Lubricant Additive to Improve Efficiency and Durability in Engines", Caterpillar Inc., Aug. 7, 2008, 27 pages.
Verma, Arpana, "Fundamental Understanding of the Synthesis and Tribological Behavior of Organic-Inorganic Nanoparticies", Dec. 2008, University of Arkansas, 147 pages.
Berdinsky et al., "Synthesis of MoS2 nanostructures from nano-size powder by thermal annealing", Electron Devices and Materials (2000), EDM (2000) Siberian Russian Student Workshops on Sep. 19-21, 2000, Piscataway, NJ, USA, pp. 20-28.
Cizaire et al., "Mechanisms of ultra-low friction by hollow inorganic fullerene-like MoS2 nanopanicles", Surface and Coatings Technology (2002) 160(2-3): pp. 282-287.
Huang et al., "Friction and wear properties of 1F-MOS2 as additive in Paraffin oil," Tribology Letters, vol. 20, Nos. 3-4, Dec. 2005, pp. 247-250.
Rapoport et al., "Fullerene-like WS2 nanoparticles: superior lubricants for harsh conditions", Advanced Materials, Apr. 17, 2003, vol. 15, Nos. 7-8, pp. 651-655.
Hu, Xianguo, "On the.size effect of molybdenum disulfide particles on tribologicaf performance", Industrial Lubrication and Tribology, 2005, vol. 57, Issue 6, pp. 255-259.
Gustavsoon et al., Nanoparticle based and sputtered WS2 low-friction coatings—Differences and similarities with respect to friction mechanisms and tribofilm formulation, Surface & Coating Technol., vol. 232, pp. 616-626, Oct. 15, 2013.
JP Patent Application No. 2014-095260, Office Action, dated May 25, 2015 (witt English translation).
USPTO Office Action for U.S. Appl. No. 11/074,597, dated Mar. 20, 2008.
USPTO Office Action for U.S. Appl. No. 11/074,597, dated Aug. 23, 2007.
USPTO Office Action for U.S. Appl. No. 11/074,597, dated Jan. 31, 2007.
USPTO Office Action for U.S. Appl. No. 12/007,555, dated Jan. 12, 2010.
USPTO Office Action for U.S. Appl. No. 12/007,555, dated Oct. 4, 2012.
Supplemental European Extended Search Report and Search Opinion for European Patent Application No. 07710113.7, dated Sep. 20, 2012.
English translation of Japanese Office Action for Application No. 2008-550538, dated Sep. 20, 2012.
International Search Report, dated Oct. 16, 2015 in PCT/US15/27925.
Extended European Search Report issued in EP Application No. 15805890.9 dated Dec. 18, 2017.
Office Action issued in JP 2016-083675, dated Apr. 23, 2018.

\* cited by examiner

DIELECTRIC NANOLUBRICANT COMPOSITIONS

CROSS-REFERENCE TO RELATED APPLICATIONS

This patent application is a continuation-in-part application and claims the benefit of the filing date under 35 U.S.C. § 120 of U.S. patent application Ser. No. 14/816,546, filed on Aug. 3, 2015. U.S. patent application Ser. No. 14/816,546 is a continuation application and claims the benefit of the filing date under 35 U.S.C. § 120 of U.S. patent application Ser. No. 13/921,640, filed on Jun. 19, 2013, now U.S. Pat. No. 9,499,766. U.S. patent application Ser. No. 13/921,640 is a continuation application and claims the benefit of the filing date under 35 U.S.C. § 120 of U.S. patent application Ser. No. 12/160,758, filed on Sep. 2, 2008, now U.S. Pat. No. 8,492,319 which issued on Jul. 23, 2013. U.S. patent application Ser. No. 12/160,758 is a national stage filing under 35 U.S.C. § 371 and claims priority to International Application No. PCT/US2007/060506, filed on Jan. 12, 2007. International Application No. PCT/US2007/060506 claims priority under 35 U.S.C. § 119(e) to U.S. Provisional Patent Application No. 60/758,307, filed on Jan. 12, 2006. The contents of the above-referenced applications are hereby incorporated by reference in their entirety.

STATEMENT REGARDING FEDERALLY SPONSORED RESEARCH OR DEVELOPMENT

This invention was made with U.S. government support under grant number NSF/DMI 0115532 awarded in part by the National Science Foundation. The U.S. government has certain rights in the invention.

BACKGROUND

Over the years, considerable effort has been expended to develop nanostructures that can be used as lubricants, coatings, or delivery mechanisms. New ways to improve nanomaterial compositions, their method of manufacture, and their use are sought.

SUMMARY

In one aspect, a dielectric nanolubricant composition includes nano-engineered lubricant additive dispersed in a base. The dielectric nanolubricant composition may include a nano-engineered lubricant additive, which may include multiple nano-engineered lubricant additives, having electrically insulating properties such as ceramics and/or polymers. In various embodiments, the nano-engineered lubricant additive may include a plurality of solid lubricant nanostructures having an open-ended architecture and an organic, inorganic, and/or polymeric medium intercalated in the nanostructures. In one embodiment, the nano-engineered lubricant additive includes a plurality of solid lubricant nanostructures having an open-ended architecture and an organic, inorganic, and/or polymeric medium, wherein a first portion of the nanostructures are intercalated with organic, inorganic, and/or polymeric medium and a second portion of the nanostructures are not intercalated with the organic, inorganic, and/or polymeric medium. In some embodiments, the solid lubricant nanostructures may comprise nano-scale macromolecules as described in U.S. patent application Ser. No. 14/816,546, U.S. Pat. No. 9,499,766, and U.S. Pat. No. 8,492,319, and, and U.S. Provisional Patent Application No. 60/758,307. In any of the above or another embodiment, all or a portion of the nanostructures may be encapsulated in all or a portion of the organic, inorganic, and/or polymeric medium. In various embodiments, the base may include a grease or oil. In one example, the grease may include a silicone grease, lithium grease, lithium complex grease, calcium sulfonate grease, silica thickened perfluoropolyether (PFPE) grease, or combinations thereof.

In various embodiments, at least a portion of the nanostructures have an average particle dimension of about a few tenths of a micron or less. In one example, the nanostructures have an average particle dimension of less than or equal to about a tenth of a micron. The nanostructures may include a material selected from polytetrafluoroethylene (PTFE), cerium fluoride, zinc oxide, silica, fluorinated carbon, calcium fluoride, calcium carbonate, hexagonal boron nitride, zirconium oxide or combinations thereof. In some embodiments, the nanostructures include a material selected from fluorinated carbon or cerium fluoride or combinations thereof. In yet another example, the nanostructures comprise polytetrafluoroethylene (PTFE) or calcium carbonate. In still yet another example, the nanostructures comprise hexagonal boron nitride or zirconium oxide.

In various embodiments, the organic, inorganic, and/or polymeric medium comprises at least one material selected from oil mediums, grease mediums, alcohol mediums, composite oil, canola oil, vegetable oils, soybean oil, corn oil, ethyl and methyl esters of rapeseed oil, silicone, polytetrafluoroethylene (PTFE), silica, distilled monoglycerides, monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, or combinations thereof. In some embodiments, the dielectric nanolubricant composition includes the nano-engineered lubricant additive in an amount 20% or less by weight.

In one embodiment, the dielectric nanolubricant composition includes the nanostructures in an amount 20% or less by weight. In one embodiment, the dielectric nanolubricant composition includes between about 10% and 95%, by weight, silicone grease, lithium grease, lithium complex grease, calcium sulfonate grease, silica thickened perfluoropolyether (PFPE) grease, or combination. In various embodiments, the composition includes an organic carrier medium. The organic carrier medium may comprise a solvent such as heptane, hexane, or mineral spirits, odorless mineral spirit, acetone, naphtha, ethyl acetate, toluene, ethylene glycol, isopropanol alcohol, methanol, ethanol, or MEK, for example. In certain embodiments, the dielectric nanolubricant composition may be formulated as a spray or gel. In one embodiment, the dielectric nanolubricant composition has an NLGI grade from #1 to #3.

In another aspect, a method of making a dielectric nanolubricant composition may include formulating a nano-engineered lubricant additive and blending the nano-engineered lubricant additive with a base to disperse the nano-engineered lubricant additive in the base. Formulating the nano-engineered lubricant additive may include chemo-mechanical milling a solid lubricant feed and a medium selected from an organic medium, inorganic medium, polymeric medium, or combinations to produce a plurality of solid lubricant nanostructures having an open-ended architecture and the medium intercalated in the nanostructures and/or that encapsulate the nanostructures, dispersed in the base. In one example, the base comprises a grease or oil. The dielectric nanolubricant composition may be a dielectric.

When compared to current products, the dielectric nanolubricant composition described herein may provide better corrosion and water resistance, high dielectric strength, longer material life, more inert chemistries, better surface protection and asperity penetration, no curing, no staining, and environmentally friendly.

Other aspects will become apparent by consideration of the detailed description and accompanying drawings.

BRIEF DESCRIPTION OF THE DRAWINGS

FIG. 6(A) shows the average wear scar diameter for a base oil (paraffin oil), paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(B) shows the load wear index for paraffin oil without a nanostructure additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(C) shows the coefficient of friction for paraffin oil without a nanostructure additive, paraffin oil with micron sized $MoS_2$ ($c-MoS_2$), paraffin oil with $MoS_2$ that was milled in air for 48 hours ($d-MoS_2$), and paraffin oil with $MoS_2$ that was milled in air for 48 hours followed by milling in canola oil for 48 hours ($n-MoS_2$). FIG. 6(D) shows the extreme pressure data for paraffin oil with micron sized $MoS_2$ ($c-MoS_2$), paraffin oil with $MoS_2$ that was milled in air for 48 hours ($d-MoS_2$), and paraffin oil with $MoS_2$ that was milled in air for 48 hours followed by milling in canola oil for 48 hours ($n-MoS_2$); in each test the solid lubricant nanostructure additive was present in the amount of 1% by weight.

DETAILED DESCRIPTION

Figure 1:
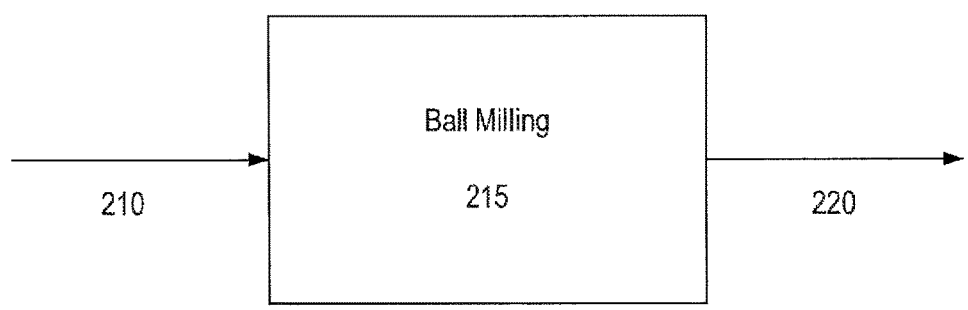
FIG. 1 is a diagram illustrating a method of producing solid lubricant nanostructures.

Herein described are compositions and methods for making compositions comprising solid lubricant nanostructures and an organic medium. Also described are nanostructures comprising layered materials. The nanostructures may include solid lubricant nanostructures. The nanostructures may be made from starting materials or solid lubricant starting materials. In various embodiments, solid lubricants may include, but are not limited to, layered materials, suitably chalcogenides, more suitably, molybdenum disulphide, tungsten disulphide, or a combination thereof. Other solid lubricants that may be used alone or in combination with the layered materials are polytetrafluoroethylene (PTFE), boron nitride (suitably hexagonal boron nitride), soft metals (such as silver, lead, nickel, copper), cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, or a combination thereof. In some embodiments, solid lubricant nanostructures comprise a material selected from the group consisting of polytetrafluoroethylene (PTFE), cerium fluoride, zinc oxide, silica, fluorinated carbon, calcium carbonate, calcium fluoride, zirconium oxide, and combinations thereof. Fluorinated carbons may be, without limitation, carbon-based materials such as graphite which has been fluorinated to improve its aesthetic characteristics. Such materials may include, for example, a material such as $CF_x$ wherein x ranges from about 0.05 to about 1.2. Such a material is produced by Allied Chemical under the trade name Accufluor.

The methods may include milling a solid lubricant feed. In one embodiment, the solid lubricant feed may be milled to particle structures comprising an average dimension of less than a micron, such as from about 500 nanometers (submicron size) to about 3 nanometers. Suitably, the structures may have an average particle dimension of less than about 900 nanometers, suitably less than or equal to about 500 nanometers, suitably less than or equal to about 100 nanometers, suitably less than or equal to about 80 nanometers, and more suitably less than or equal to about 50 nanometers. In one embodiment, the ball milling may result in milled solid lubricant structures comprising a mixture, wherein the mixture comprises structures having an average particle dimension of less than or equal to about 500 nanometers, plus larger structures. Milling may include, among other things, ball milling and chemo mechanical milling. Examples of ball milling may include dry ball milling, wet ball milling, and combinations thereof. Ball milling may refer to an impaction process that may include two interacting objects where one object may be a ball, a rod, 4 pointed pins (jack shape), or other shapes. Chemo mechanical milling may refer to an impaction process that may form a complex between an organic medium and a nanostructure. As a result of chemo mechanical milling, the organic medium may coat, encapsulate, or intercalate the nanostructures.

In another embodiment, the solid lubricant feed may be dry milled and then wet milled. An emulsifier may be mixed with a base and added to the wet milled structures. Dry milling may refer to structures that have been milled in the presence of a vacuum, a gas, or a combination thereof. Wet milling may refer to structures that have been milled in the presence of a liquid.

The solid lubricant nanostructure composition may further comprise an organic medium. Examples of organic mediums include, but are not limited to, oil mediums, grease mediums, alcohol mediums, or combinations thereof. Specific examples of organic mediums include, but are not limited to, composite oil, canola oil, vegetable oils, soybean oil, corn oil, ethyl and methyl esters of rapeseed oil, distilled monoglycerides, monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, n-hexadecane, hydrocarbon oils, phospholipids, or a combination thereof. Many of these organic media may be environmentally acceptable.

The composition may contain emulsifiers, surfactants, or dispersants. Examples of emulsifiers may include, but are not limited to, emulsifiers having a hydrophilic-lipophilic balance (HLB) from about 2 to about 7; alternatively, a HLB from about 3 to about 5; or alternatively, a HLB of about 4. Other examples of emulsifiers may include, but are not limited to, lecithins, soy lecithins, phospholipids lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, or a combination thereof.

A method of making a lubricant is described. The composition may be used as an additive dispersed in a base. Examples of bases may include, but are not limited to, oils, greases, plastics, gels, sprays, or a combination thereof. Specific examples of bases may include, but are not limited to, hydrocarbon oils, vegetable oils, corn oil, peanut oil, canola oil, soybean oil, mineral oil, paraffin oils, synthetic oils, petroleum gels, petroleum greases, hydrocarbon gels, hydrocarbon greases, lithium based greases, fluoroether based greases, ethylenebisstearamide, waxes, silicones, or a combination thereof.

Described herein is a method of lubricating or coating an object that is part of an end application with a composition comprising at least one of solid lubricant nanostructures and an organic medium. Further described is a method of lubricating an object by employing the composition comprising solid lubricant nanostructures and an organic medium as a delivery mechanism.

Disclosed herein are compositions and methods of preparing nanostructure based lubricants that, among various advantages, display enhanced dispersion stability and resistance to agglomeration. FIG. 1 illustrates a method of preparing nanostructure based lubricants or compositions. A solid lubricant feed is introduced via line 210 to a ball milling processor 215. Ball milling is carried out in the processor 215 and the solid lubricant feed is milled to comprise structures having an average particle dimension of less than or equal to about 500 nanometers, suitably less than or equal to about 100 nanometers, suitably less than or equal to about 80 nanometers, and more suitably less than or equal to about 50 nanometers. Alternatively, the ball milling may result in milled solid lubricant structures comprising a mixture, the mixture comprising structures having an average particle dimension of less than or equal to about 500 nanometers, plus larger structures. The ball milling may be high energy ball milling, medium energy ball milling, or combinations thereof. Additionally, in various embodiments the ball milling may be carried out in a vacuum, in the presence of a gas, in the presence of a liquid, in the presence of a second solid, or combinations thereof. The nanostructure composition may be removed from the processor via line 220. The nanostructure composition may be a nanostructure based lubricant.

Figure 2:
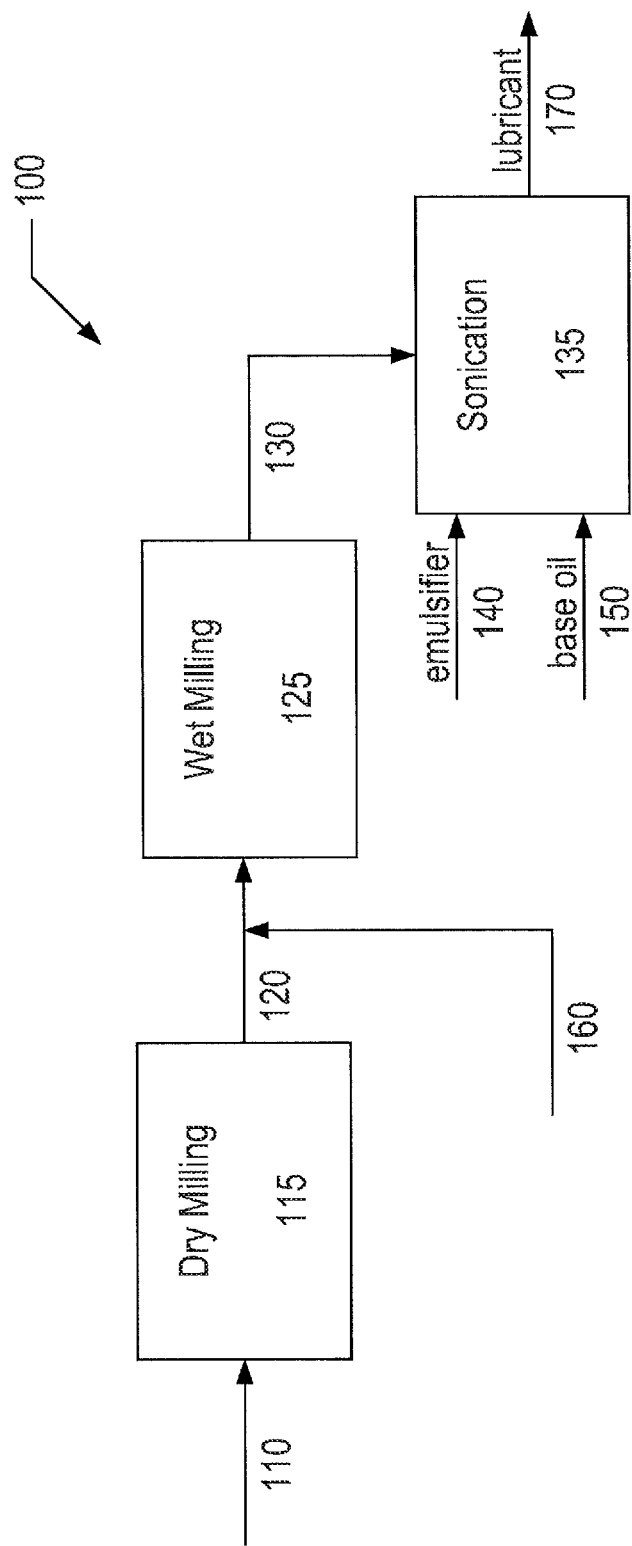
FIG. 2 is a diagram illustrating one method of preparing nanostructure based lubricants.

In alternative embodiments, the ball milling may comprise a first ball milling and at least one more subsequent ball millings, or ball milling and/or other processing as appropriate. Suitably, the ball milling may comprise dry milling followed by wet milling. FIG. 2 illustrates a further method 100 of preparing nanostructure based lubricants where dry milling is followed by wet milling Feed 110 introduces a solid lubricant feed into a ball milling processor 115 where dry ball milling, such as in a vacuum or in air, reduces the solid lubricant feed to structures having an average dimension of the size described above. Line 120 carries the dry milled structures to a wet milling processor 125. Via line 160 the dry milled structures are combined with a composite oil or an organic medium prior to entering the wet milling processor 125. Alternatively, the organic medium and dry milled structures may be combined in the wet milling processor 125. In further alternative embodiments (not shown), the dry milling and wet milling may be carried out in a single processor where the organic medium is supplied to the single processor for wet milling after initially carrying out dry milling. In other alternative embodiments, the balls in the ball milling apparatus may be coated with the organic medium to incorporate the organic medium in the solid lubricant nanostructures.

After wet milling, line 130 carries the wet milled structures to a container 135, which may be a sonication device. Alternatively, line 130 may carry a mixture comprising solid lubricant nanostructures, organic medium, and a complex comprising the solid lubricant nanostructures combined with an organic medium.

In another embodiment, prior to introduction of the wet milled structures into the container 135, a base may be fed to the container 135 via line 150. Alternatively, the base may be supplied to the wet milling processor 125 and the mixing, which may include sonicating, may be carried out in the wet milling processor 125. In such embodiments the solid lubricant nanostructure composition may be employed as an additive and dispersed in the base. A base may be paired with a solid lubricant nanostructure composition according to the ability of the base and the solid lubricant nanostructure composition to blend appropriately. In such cases the solid lubricant nanostructure composition may enhance performance of the base.

In a further embodiment, an emulsifier may be mixed with the base. Emulsifiers may further enhance dispersion of the solid lubricant nanostructure composition in the base. The emulsifier may be selected to enhance the dispersion stability of a nanostructure composition in a base. An emulsifier may also be supplied to the container 135 via line 140. In many embodiments, the emulsifier and base are combined in the container 135 prior to introduction of the wet milled structures. Prior mixing of the emulsifier with the base may enhance dispersion upon addition of complexes of solid lubricant nanostructures and organic medium and/or solid lubricant nanostructures by homogeneously dispersing/dissolving the complexes/nanostructures. In some embodiments, the mixing of the emulsifier and base may comprise sonicating. Alternatively, the emulsifier may be supplied to the wet milling processor 125 and the mixing, which may include sonicating, may be carried out in the wet milling processor 125. The lubricant removed from the container 135 via line 120 may be a blend comprising the wet milled structures, organic medium, and base. The blend may further comprise an emulsifier. In other alternative embodiments, additives may be added to the nanostructure based lubricant during interaction with a mating surface.

In a further embodiment, antioxidants or anticorrosion agents may be milled with the solid lubricant nanostructures. Examples of antioxidants include, but are not limited to, hindered phenols, alkylated phenols, alkyl amines, aryl amines, 2,6-di-tert-butyl-4-methylphenol, 4,4'-di-tert-octyldiphenylamine, tert-Butyl hydroquinone, tris(2,4-di-tert-butylphenyl)phosphate, phosphites, thioesters, or a combination thereof. Examples of anticorrosion agents include, but are not limited to, alkaline-earth metal bisalkylphenolsulphonates, dithiophosphates, alkenylsuccinic acid halfamides, or a combination thereof. In another embodiment, biocidals may be milled with the solid lubricant nanostructures. Examples of biocidals may include, but are not limited to, alkyl or kydroxylamine benzotriazole, an amine salt of a partial alkyl ester of an alkyl, alkenyl succinic acid, or a combination thereof.

In yet another embodiment, further processing of wet milled structures may comprise removal of oils that are not a part of a complex with the solid lubricant structures. Such methods may be suitable for applications that benefit from use of dry structures of solid lubricant, such as coating applications. Oil and/or other liquids can be removed from wet milled structures to produce substantially dry solid lubricant structures and complexes. Such wet milling followed by drying may produce a solid lubricant with reduced tendency to agglomerate. In specific embodiments, an agent, such as acetone, can be added that dissolves oils that are not a part of a complex, followed by a drying process such as supercritical drying, to produce a substantially dry solid lubricant comprising structures treated by milling in an organic medium.

Ball milling conditions may vary and, in particular, conditions such as temperature, milling time, and size and materials of the balls and vials may be manipulated. In various embodiments, ball milling may be carried out from about 12 hours to about 50 hours, suitably from about 36 hours to about 50 hours, suitably from about 40 hours to about 50 hours, and more suitably at about 48 hours. Suitably, ball milling is conducted at room temperature. The benefits of increasing milling time may comprise at least one of increasing the time for the organic medium and solid lubricant nanostructures to interact; and producing finer sizes, better yield of nanostructures, more uniform shapes, and more passive surfaces. An example of ball milling equipment suitable for carrying out the described milling includes the SPEX CertiPrep model 8000D, along with hardened stainless steel vials and hardened stainless steel grinding balls, but any type of ball milling apparatus may be used. In one embodiment, a stress of 600-650 MPa, a load of 14.9 N, and a strain of $10^{-3}$-$10^{-4}$ per sec may be used.

The proportions of the components in a nanostructure based lubricant may contribute to performance of the lubricant, such as the lubricants dispersion stability and ability to resist agglomeration. In wet milling, suitable ratios of solid lubricant nanostructures to organic medium may be about 1 part structures to about 4 parts organic medium by weight, suitably, about 1 part structures to about 3 parts organic medium by weight, suitably, about 3 parts structures to about 8 parts organic medium by weight, suitably, about 2 parts structures to about 4 parts organic medium by weight, suitably, about 1 part structures to about 2 parts organic medium by weight, and suitably, about 1 part structures to about 1.5 parts organic medium by weight.

Suitable ratios of organic medium to emulsifier in a lubricant including the solid lubricant nanostructures may be about 1 part organic medium to less than or equal to about 1 part emulsifier, suitably, about 1 part organic medium to about 0.5 parts emulsifier by weight, or suitably, from about 0.4 to about 1 part emulsifier for about 1 part organic medium by weight.

The amount of solid lubricant nanostructure composition (by weight) sonicated or dispersed in the base may be from about 0.25% to about 5%, suitably 0.5% to about 3%, suitably 0.5% to about 2%, and more suitably 0.75% to about 2%.

The amount of emulsifier (by weight) sonicated or dissolved in the base, depending on the end application, shelf-life, and the like, may be from about 0.5% to about 10%, suitably from about 4% to about 8%, suitably from about 5% to about 6%, and suitably, from about 0.75% to about 2.25%.

The solid lubricant nanostructure composition may be used, without limitation, as lubricants, coatings, delivery mechanisms, or a combination thereof. The solid lubricant nanostructure composition may be used, without limitation, as an additive dispersed in a base oil. The composition may also be used, without limitation, to lubricate a boundary lubrication regime. A boundary lubrication regime may be a lubrication regime where the average oil film thickness may be less than the composite surface roughness and the surface asperities may come into contact with each other under relative motion. During the relative motion of two surfaces with lubricants in various applications, three different lubrication stages may occur, and the boundary lubrication regime may be the most severe condition in terms of temperature, pressure and speed. Mating parts may be exposed to severe contact conditions of high load, low velocity, extreme pressure (for example, 1-2 GPa), and high local temperature (for example, 150-300 degrees C.). The boundary lubrication regime may also exist under lower pressures and low sliding velocities or high temperatures. In the boundary lubrication regime, the mating surfaces may be in direct physical contact. The composition may further be used, without limitation, as a lubricant or coating in machinery applications, manufacturing applications, mining applications, aerospace applications, automotive applications, pharmaceutical applications, medical applications, dental applications, cosmetic applications, food product applications, nutritional applications, health related applications, bio-fuel applications or a combination thereof. Specific examples of uses in end applications include, without limitation, machine tools, bearings, gears, camshafts, pumps, transmissions, piston rings, engines, power generators, pin-joints, aerospace systems, mining equipment, manufacturing equipment, or a combination thereof. Further specific examples of uses may be, without limitation, as an additive in lubricants, greases, gels, compounded plastic parts, pastes, powders, emulsions, dispersions, or combinations thereof. The composition may also be used as a lubricant that employs the solid lubricant nanostructure composition as a delivery mechanism in pharmaceutical applications, medical applications, dental applications, cosmetic applications, food product applications, nutritional applications, health related applications, bio-fuel applications, or a combination thereof. The various compositions and methods may also be used, without limitation, in hybrid inorganic-organic materials. Examples of applications using inorganic-organic materials, include, but are not limited to, optics, electronics, ionics, mechanics, energy, environment, biology, medicine, smart membranes, separation devices, functional smart coatings, photovoltaic and fuel cells, photocatalysts, new catalysts, sensors, smart microelectronics, micro-optical and photonic components and systems for nanophotonics, innovative cosmetics, intelligent therapeutic vectors that combined targeting, imaging, therapy, and controlled release of active molecules, and nanoceramic-polymer composites for the automobile or packaging industries.

Figure 7:
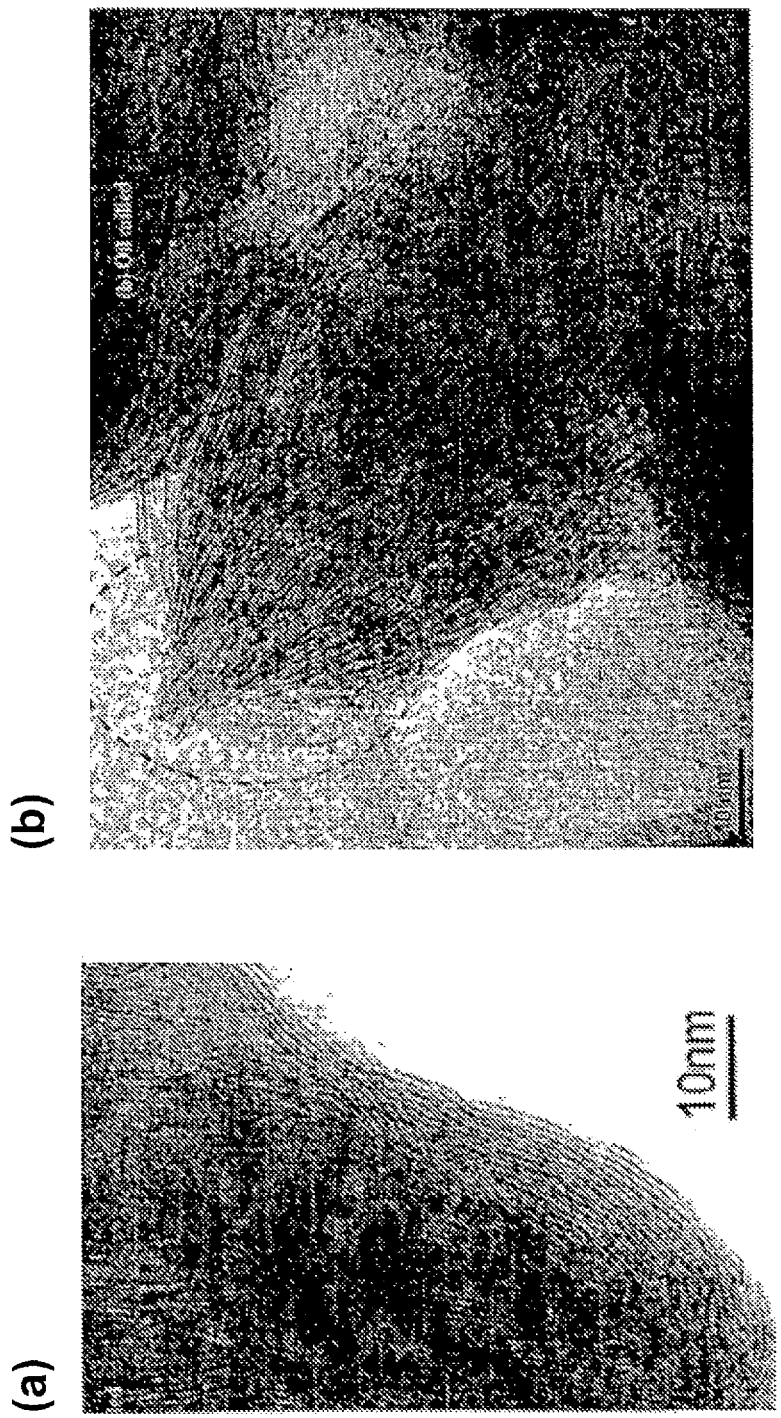
FIG. 7 is a TEM image showing the architecture of molybdenum disulfide nanostructures (15-70 nm average size). Panel (a) shows the close caged dense oval shaped architecture of molybdenum disulfide nanostructures that have been ball milled in air for 48 hours. Panel (b) shows the open ended oval shaped architecture of molybdenum disulfide nanostructures that have been ball milled in air for 48 hours followed by ball milling in canola oil for 48 hours.
Figure 8:
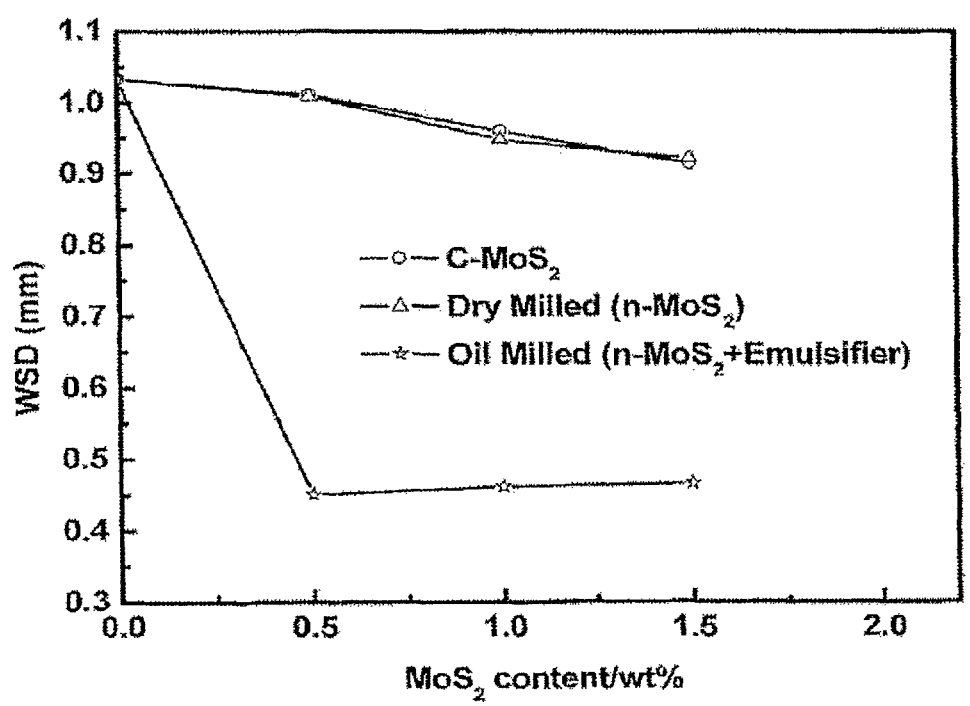
FIG. 8 is a graph depicting a comparison of wear scar diameters for different additives in paraffin oil. One additive is crystalline molybdenum disulfide ($c-MoS_2$). Another is molybdenum disulfide nanostructures that were ball milled in air ($n-MoS_2$). Another additive is molybdenum disulfide nanostructures that were ball milled in air followed by ball milling in canola oil and to which a phospholipid emulsifier was added ($n-MoS_2$+Emulsifier).

In some embodiments, the ball milling process may create a close caged dense oval shaped architecture (similar to a football shape or fullerene type architecture). This may occur when molybdenum disulphide is milled in a gas or vacuum. Panel (a) of FIG. 7 shows the close caged dense oval shaped architecture of molybdenum disulphide nanostructures that have been ball milled in air for 48 hours.

In other embodiments, the ball milling process may create an open architecture. For example, ball milling process may create an open ended oval shaped architecture (similar to a coconut shape) of molybdenum disulphide nanostructures which are intercalated and encapsulated with an organic medium and phospholipids. This may occur when molybdenum disulphide is milled in a gas or vacuum followed by milling in an organic medium. Panel (b) of FIG. 7 shows the open ended oval shaped architecture of molybdenum disulphide nanostructures that have been ball milled in air for 48 hours followed by ball milling in canola oil for 48 hours.

As shown in the examples, the tribological performance of the nanostructure based lubricant may be improved. The tribological performance may be measured by evaluating different properties. An anti-wear property may be a lubricating fluid property that has been measured using the industry standard Four-Ball Wear (ASTM D4172) Test. The Four-Ball Wear Test may evaluate the protection provided by an oil under conditions of pressure and sliding motion. Placed in a bath of the test lubricant, three fixed steel balls may be put into contact with a fourth ball of the same grade in rotating contact at preset test conditions. Lubricant wear protection properties may be measured by comparing the average wear scars on the three fixed balls. The smaller the average wear scar, the better the protection. Extreme pressure properties may be lubricating fluid properties that have been measured using the industry standard Four-Ball Wear (ASTM D2783) Test. This test method may cover the determination of the load-carrying properties of lubricating fluids. The following two determinations may be made: 1) load-wear index (formerly Mean-Hertz load) and 2) weld load (kg). The load-wear index may be the load-carrying property of a lubricant. It may be an index of the ability of a lubricant to minimize wear at applied loads. The weld load may be the lowest applied load in kilograms at which the rotating ball welds to the three stationary balls, indicating the extreme pressure level that the lubricants can withstand. The higher the weld point scores and load wear index values, the better the anti-wear and extreme pressure properties of a lubricant. The coefficient of friction (COF) may be a lubricating fluid property that has been measured using the industry standard Four-Ball Wear (ASTM D4172) Test. COF may be a dimensionless scalar value which describes the ratio of the force of friction between two bodies and the force pressing them together. The coefficient of friction may depend on the materials used. For example, ice on metal has a low COF, while rubber on pavement has a high COF. A common way to reduce friction may be by using a lubricant, such as oil or water, which is placed between two surfaces, often dramatically lessening the COF.

The composition may have a wear scar diameter of about 0.4 mm to about 0.5 mm. The composition may have a COF of about 0.06 to about 0.08. The composition may have a weld load of about 150 kg to about 350 kg. The composition may have a load wear index of about 20 to about 40. The values of these tribological properties may change depending on the amount of solid lubricant nanostructure composition sonicated or dissolved in the base.

Various features and aspects of the invention are set forth in the following examples, which are intended to be illustrative and not limiting.

Example 1

Ball milling was performed in a SPEX 8000D machine using hardened stainless steel vials and balls. $MoS_2$ (Alfa Aesar, 98% pure, 700 nm average primary structure size) and canola oil (Crisco) were used as the starting materials in a ratio of 1 part $MoS_2$ (10 grams) to 2 parts canola oil (20 grams). The ball to powder weight ratio was 2 to 1. $MoS_2$ was ball milled for 48 hours in air followed by milling in canola oil for 48 hrs at room temperature. The nanostructures were about 50 nm after ball milling. Table 1 summarizes milling conditions and resultant structure morphologies. It was observed that there was a strong effect of milling media on the shape of the ball milled nanostructures. Dry milling showed buckling and folding of the planes when the structure size was reduced from micron size to nanometer size. However, the dry milling condition used here produced micro clusters embedding several nanostructures. On the other hand, wet milling showed no buckling but saw de-agglomeration.

TABLE 1

Milling conditions and parametric effect on particle size and shape

| Dry Milling | Shape of the particles | Shape of the clusters |
| --- | --- | --- |
| 12 hours | Plate-like with sharp edges | Sharp and irregular |
| 24 hours | Plate-like with round edges | More or less rounded |
| 48 hours | Spherical | Globular clusters |
| Wet Milling | Shape of the Particles | Shape of the clusters |
| 12 hours | Thin plates with sharp edges | Thin plates with sharp edges |
| 24 hours | Thin plates with sharp edges | Thin plates with sharp edges |
| 48 hours | Thin plates with sharp edges | Thin plates with sharp edges |

TABLE 2

Effect of milling media on resultant size (starting size sub-micron), shape, and agglomeration of particles

| Properties | Dry | Alcohol | Oil | Dry milled and oil milled |
|---|---|---|---|---|
| Clusters size (nm) | 100 | 300 | 200 | 100 |
| Particle size (nm) | 30 | 80 | 80 | 30 |
| Agglomeration | High | Very less | Very less | Very less |
| Shape of the particles | Spherical | Platelet | Platelet | Spherical |

Figure 3:
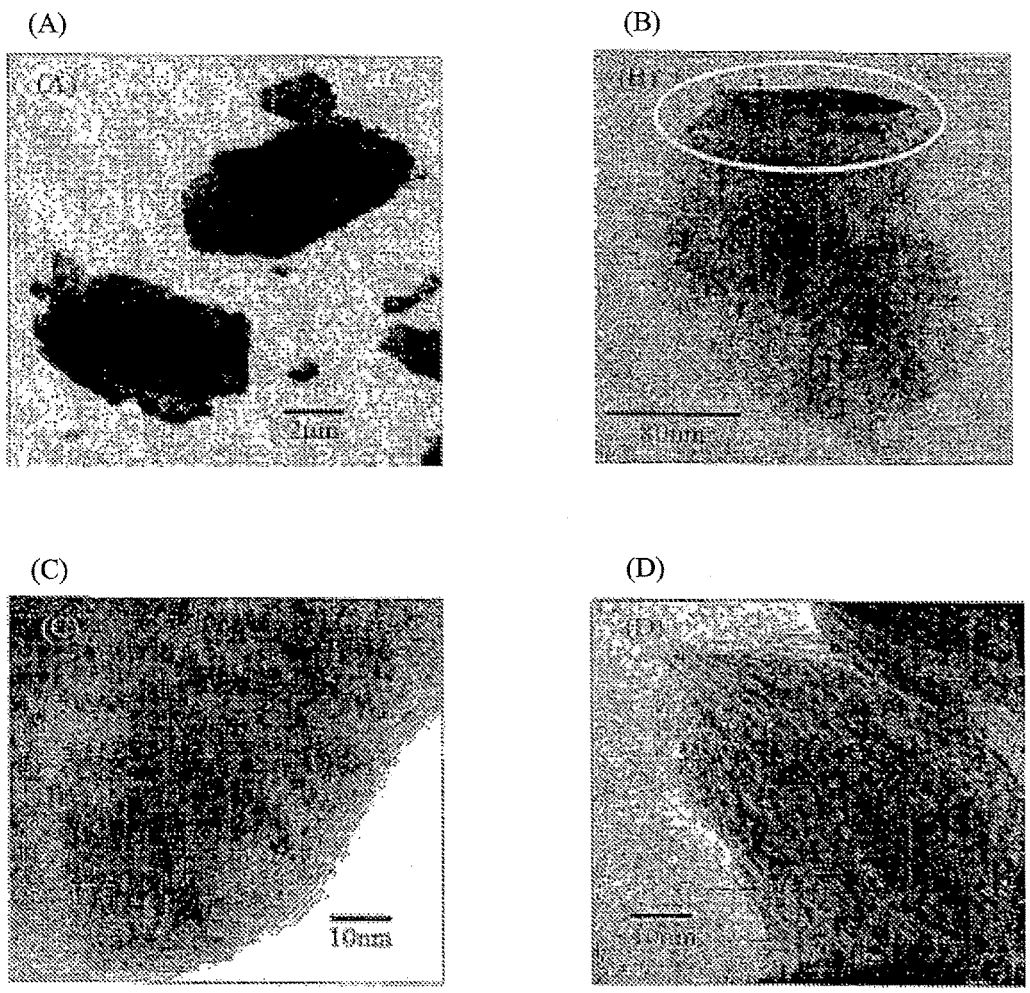
FIG. 3 shows transmission electron microscopy (TEM) micrographs of molybdenum disulfide particles. Panel (A) shows molybdenum disulfide as it is available, typically from about a few microns to submicron size. Panel (B) shows molybdenum disulfide that has been ball milled in air for 48 hours. Panel (C) is a high resolution electron microscopy image that shows molybdenum disulfide that has been ball milled in air for 48 hours. Panel (D) is a high-resolution transmission electron microscopy (HRTEM) image that shows molybdenum disulfide that has been ball milled in air for 48 hours followed by ball milling in oil for 48 hours.

FIG. 3 shows TEM micrographs of the as-available (700 nm), air milled, and hybrid milled (48 hrs in air medium followed by 48 hours in oil medium) $MoS_2$ nanostructures. Panel (A) represents micron-sized structure chunks of the as-available $MoS_2$ sample off the shelf. These micrographs, particularly panel (B), represent agglomerates of lubricant nanostructures when milled in the air medium. Panel (B) clearly demonstrates size reduction in air milled $MoS_2$. Higher magnification (circular regions) revealed formation of the disc shaped nanostructures after milling in the air medium. From panels (C) and (D) it may be concluded that the structure size was reduced to less than 30 nm after milling in air and hybrid conditions. Regardless of the occasionally observed clusters, the average size of the clusters is less than or equal to 200 nm.

Hybrid milled samples were dispersed in paraffin oil (from Walmart) and remained suspended without settling. However, the dispersion was not uniform after a few weeks. To stabilize the dispersion and extend the anti-wear properties, phospholipids were added. Around 2% by weight of soy lecithin phospholipids (from American Lecithin) was added in the base oil.

Figure 4:
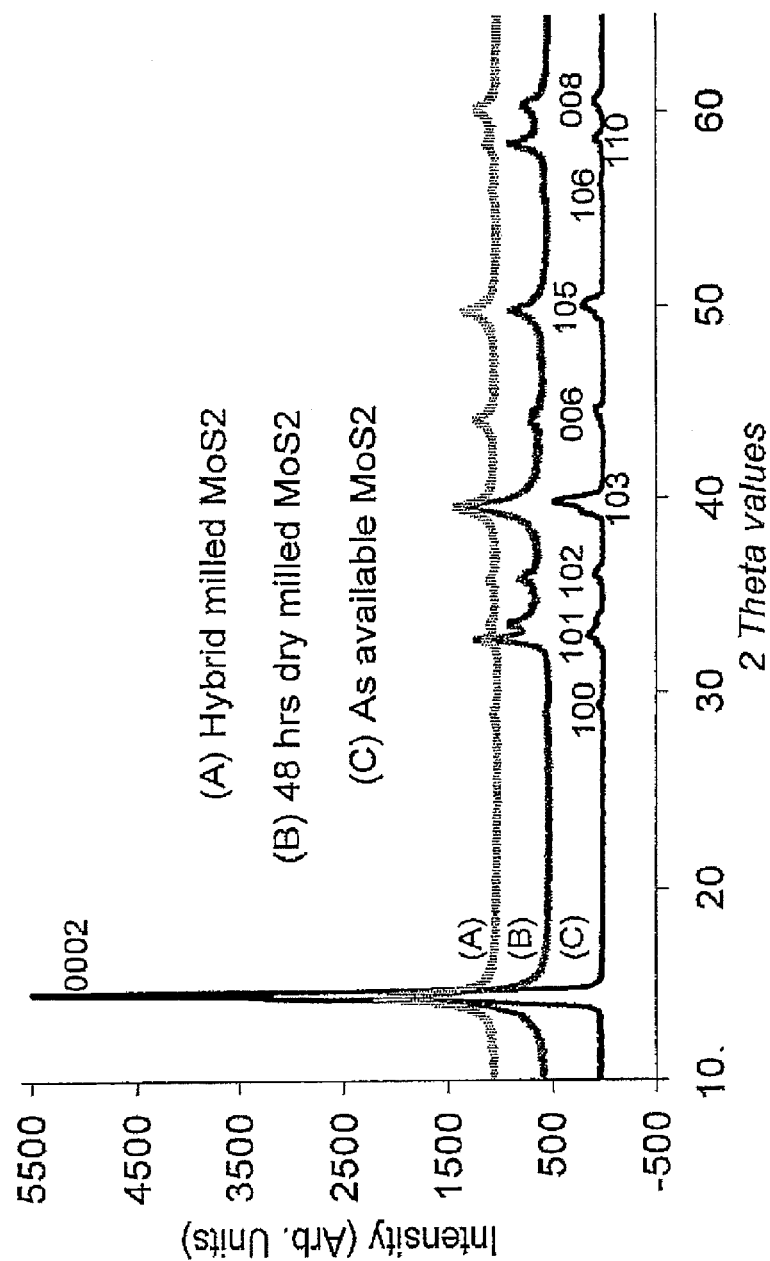
FIG. 4 is a graph showing XRD spectra of molybdenum disulfide particles. Line (A) is the XRD spectra for molybdenum disulfide that has been ball milled in air for 48 hours followed by ball milling in oil for 48 hours. Line (B) is the XRD spectra for molybdenum disulfide that has been ball milled in air for 48 hours. Line (C) is the XRD spectra for molybdenum disulfide that has not been ball milled.
Figure 5:
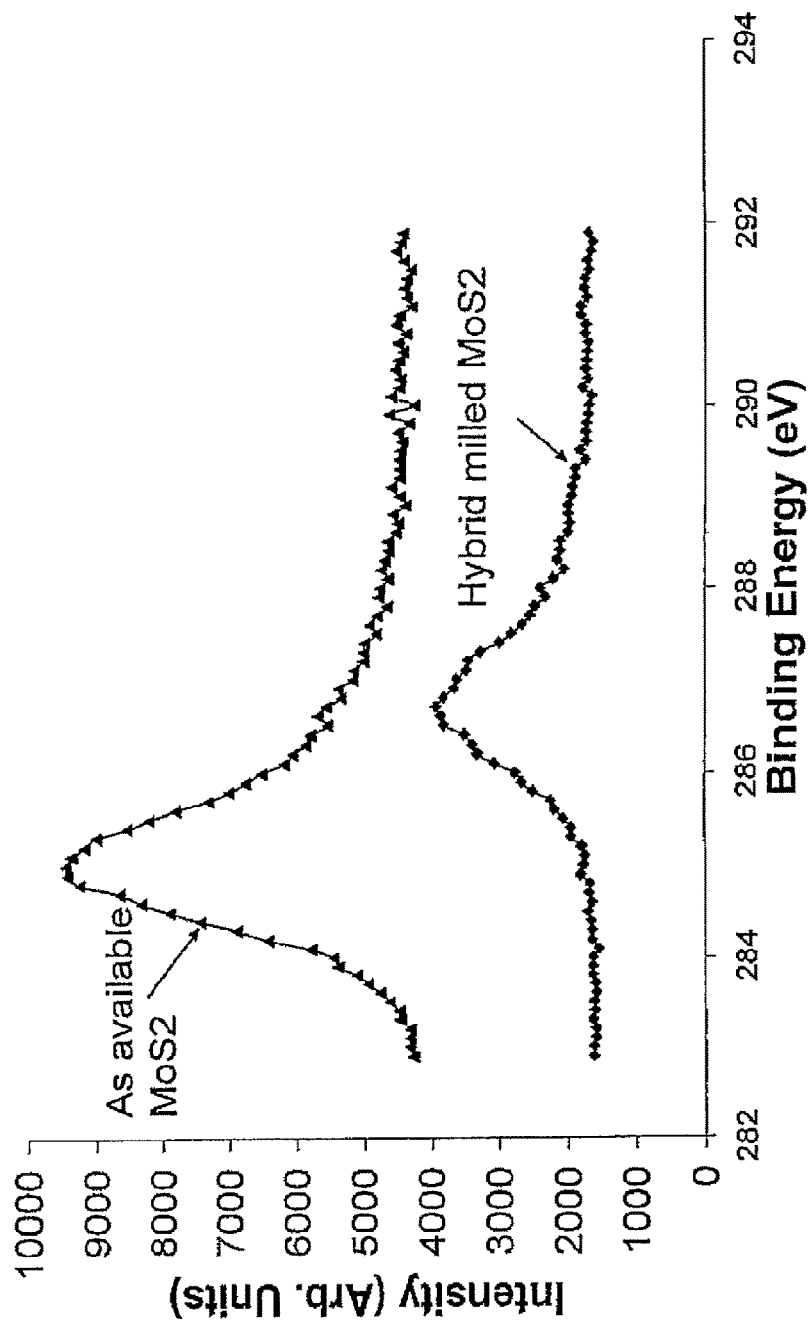
FIG. 5 is a graph showing XPS spectra of molybdenum disulfide particles in which the carbon peak for molybdenum disulfide that has not been ball milled is shown, as well as the carbon Peak for molybdenum disulfide that has been ball milled in air for 48 hours, followed by ball milling in oil for 48 hours.

FIGS. 4 and 5 show the XRD and XPS spectra of $MoS_2$ before and after ball milling, respectively. XRD spectra revealed no phase change as well as no observable amorphization in the $MoS_2$ after milling. This observation is consistent with the continuous platelets observed throughout the nanostructure matrix in TEM analysis for milled material. Broadening of peaks (FWHM) was observed in XRD spectra of $MoS_2$ ball milled in air and hybrid media, respectively. The peak broadening may be attributed to the reduction in structure size. The estimated grain size is 6 nm. This follows the theme of ball milling where clusters consist of grains and sub-grains of the order of 10 nm. XPS analysis was carried out to study the surface chemistry of the as-available and hybrid milled $MoS_2$ nanostructures. As shown in FIG. 5, a carbon (C) peak observed at 285 eV in the as-available $MoS_2$ sample shifted to 286.7 eV. Bonding energies of 286 eV and 287.8 eV correspond to C—O and C═O bond formation, respectively. The observed binding energy level may demonstrate that a thin layer containing mixed C—O & C═O groups enfolds the $MoS_2$ structures.

Preliminary tribological tests on the synthesized nanostructures were performed on a four-ball machine by following ASTM 4172. The balls used were made of AISI 52100 stainless steel and were highly polished. Four Ball Wear Scar measurements using ASTM D4172 were made under the following test conditions:

| Test Temperature, ° C. | 75 (±1.7) |
|---|---|
| Test Duration, min | 60 (±1) |
| Spindle Speed, rpm | 1,200 (±60) |
| Load, kg | 40 (±0.2) |

Wear scar diameter (WSD, mm) of each stationary ball was quantified in both vertical and horizontal directions. The average value of WSD from 3 independent tests was reported within ±0.03 mm accuracy.

Four Ball Extreme Pressure measurements using ASTM D2783 were made under the following test conditions:

| Test Temperature, ° C. | 23 |
|---|---|
| Test Duration, min | 60 (±1) |
| Spindle Speed, rpm | 1,770 (±60) |
| Load, kg | Varies, 10-sec/stage |
| Ball Material | AISI-E52100 |
| Hardness | 64-66 |
| Grade | 25EP |

Figure 6A:
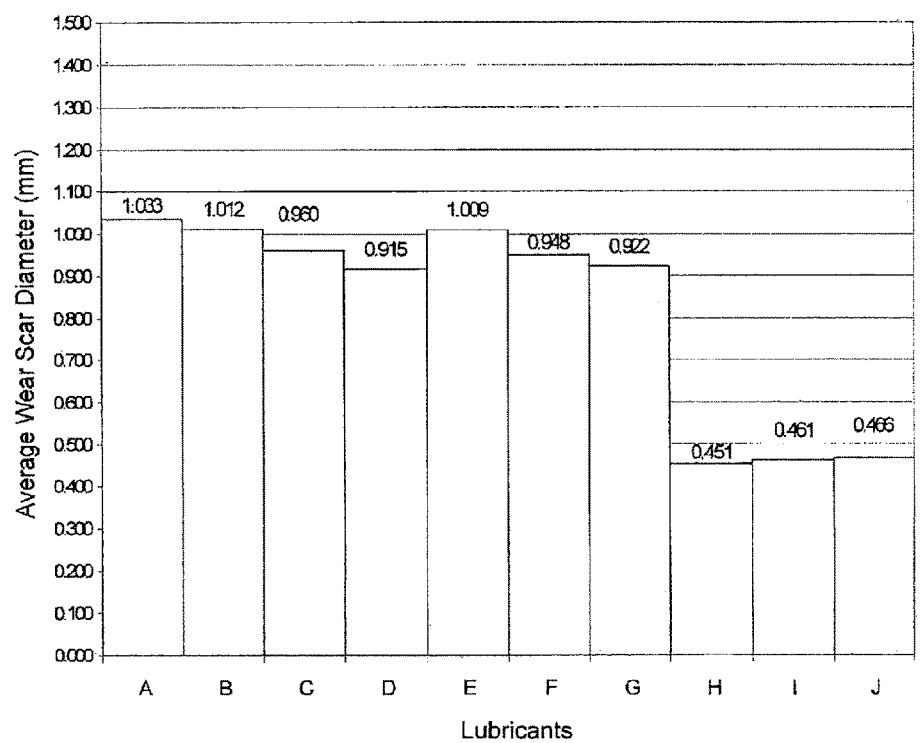
FIGS. 6(A)-6(D) show graphs and bar charts depicting tribological test data for different additives in paraffin oil.
Figure 6B:
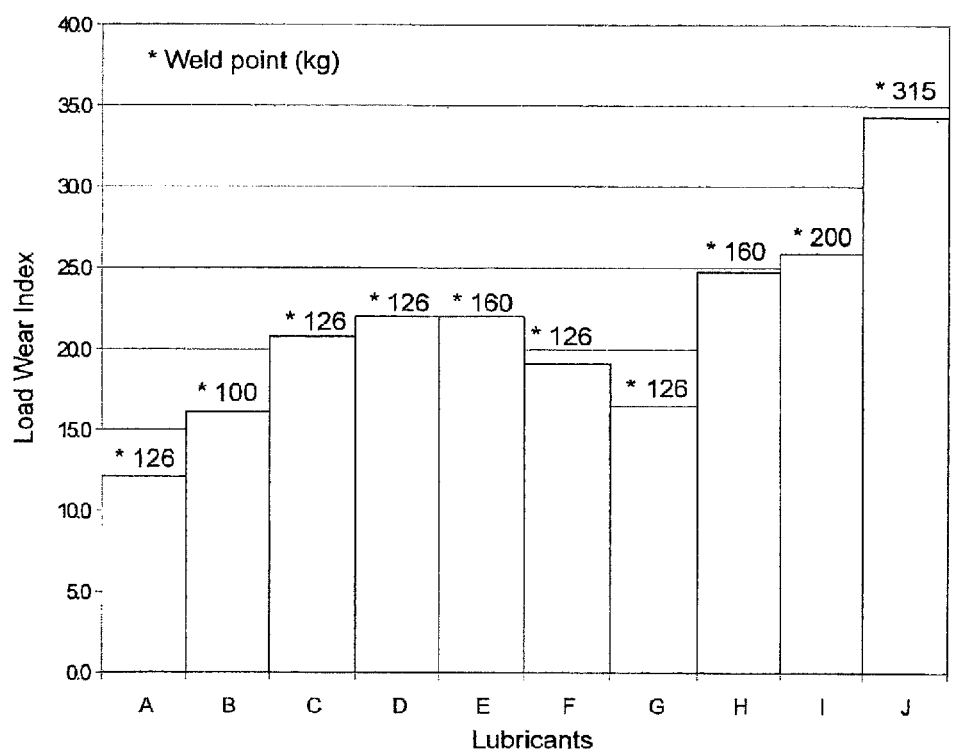
Figure 6C:
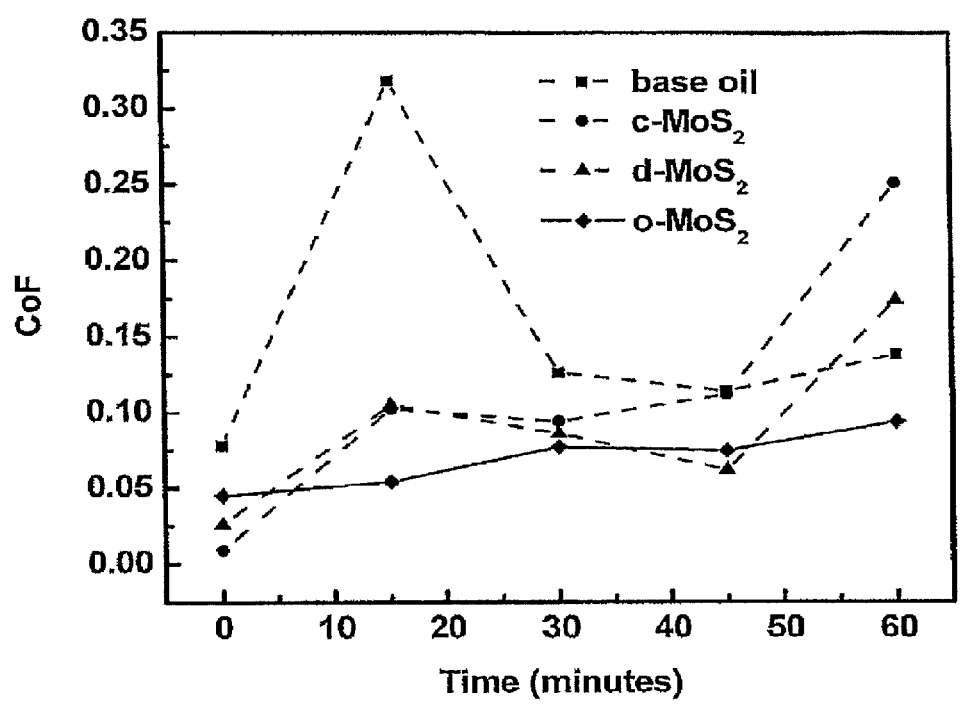
Figure 6D:
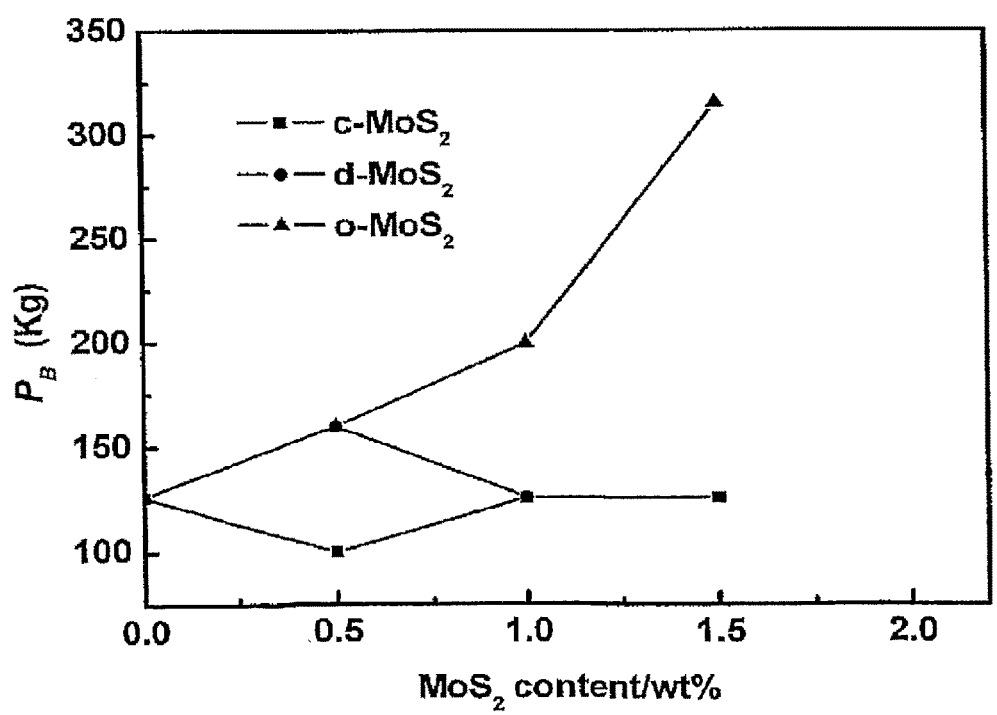

Three different structures (in w/w ratio) were evaluated for their anti-wear properties as additives in paraffin oil. FIG. 6(A) shows the average wear scar measurements for paraffin oil without a nanostructure additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(B) shows the load wear index for paraffin oil without a nanostructure additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(C) shows the COF for paraffin oil without a nanostructure additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(D) shows the extreme pressure data for paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. In each test the nanostructure additive was present in the amount of 1% by weight.

Test data from nanostructure composition additive in base oil

| Solid Lubricant | Four Ball Tests at 40 kg Load (ASTM D4172) | | Four Ball Extreme Pressure (ASTM D-2783) | | |
|---|---|---|---|---|---|
| All dispersions diluted to x % by wt. in reference base oil | WSD (mm) | COF | Weld Load (kg) | Load Wear Index | FIG. 6(A) and 6(B) |
| Paraffin oil | 1.033 | 0.155 | 126 | 12.1 | A |
| Nanostructures of $MoS_2$ without organic medium (0.5%) | 1.012 | 0.102 | 100 | 16.1 | B |
| Nanostructures of $MoS_2$ | 0.960 | 0.114 | 126 | 20.8 | C |

-continued

Test data from nanostructure composition additive in base oil

| Solid Lubricant All dispersions diluted to x % by wt. in reference base oil | Four Ball Tests at 40 kg Load (ASTM D4172) | | Four Ball Extreme Pressure (ASTM D-2783) | | FIG. 6(A) and 6(B) |
|---|---|---|---|---|---|
| | WSD (mm) | COF | Weld Load (kg) | Load Wear Index | |
| without organic medium (1.0%) | | | | | |
| Nanostructures of $MoS_2$ without organic medium (1.5%) | 0.915 | 0.098 | 126 | 22.0 | D |
| Conventional available micro structures (0.5%) | 1.009 | 0.126 | 160 | 22.0 | E |
| Conventional available micro structures (1.0%) | 0.948 | 0.091 | 126 | 19.1 | F |
| Conventional available micro structures (1.5%) | 0.922 | 0.106 | 126 | 16.5 | G |
| NanoGlide: Nanostructures of $MoS_2$ with organic medium (0.5%) | 0.451 | 0.077 | 160 | 24.8 | H |
| NanoGlide: Nanostructures of $MoS_2$ with organic medium (1.0%) | 0.461 | 0.069 | 200 | 25.9 | I |
| NanoGlide: Nanostructures of $MoS_2$ with organic medium (1.5%) | 0.466 | 0.075 | 315 | 34.3 | J |

Figure 9:
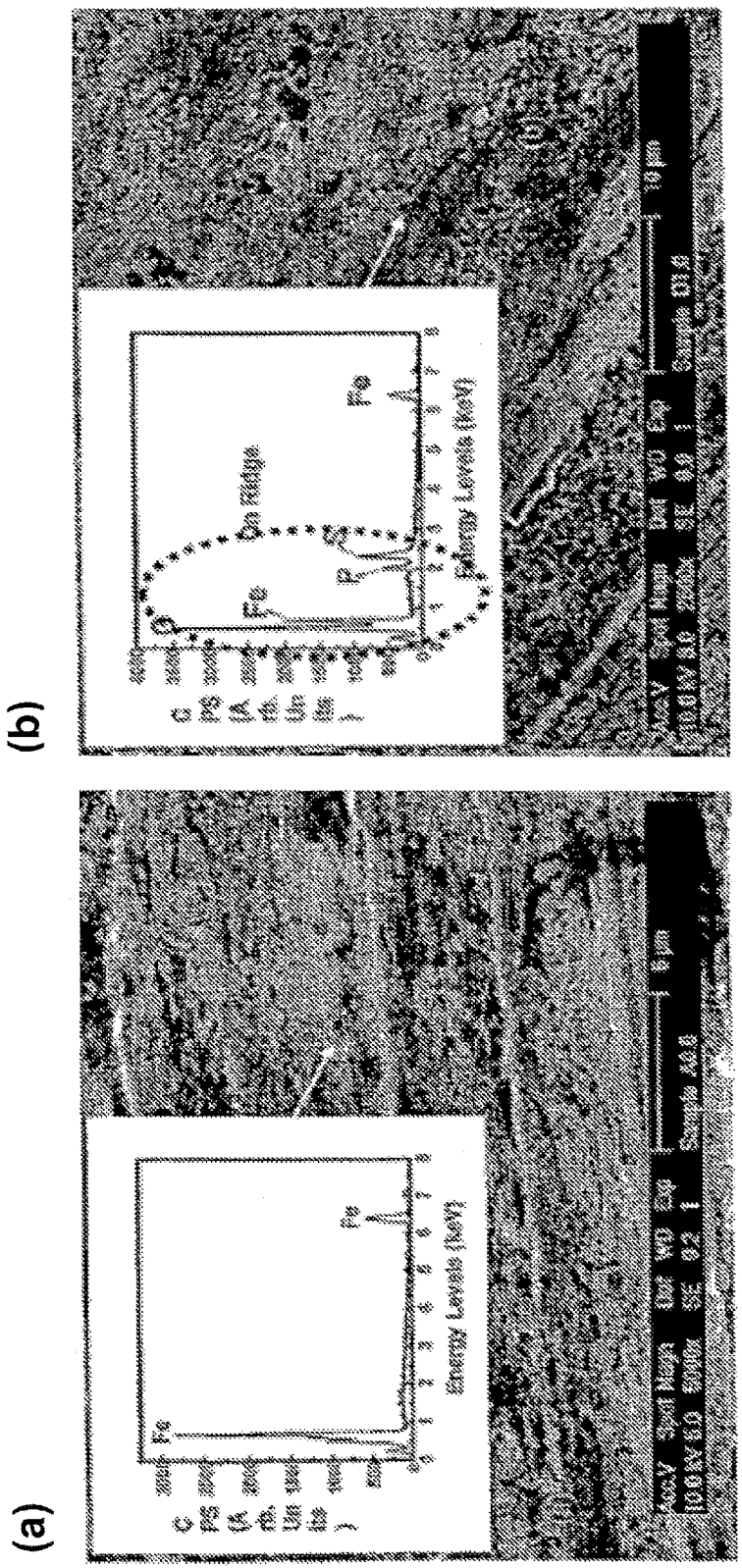
FIG. 9 shows photographs and graphs produced using energy dispersive x-ray analysis (EDS) depicting the chemical analysis of wear scar diameters in four-ball tribological testing for nanostructure based lubricants. Panel (a) shows paraffin oil without any nanostructure composition additive. Panel (b) shows paraffin oil with molybdenum disulfide nanostructures that have been ball milled in air for 48 hours followed by ball milling in oil for 48 hours and treated with a phospholipid emulsifier.

The transfer film in the wear scar, studied using energy dispersive x-ray analysis (EDS), identified the signatures of phosphates in addition to molybdenum and sulfur. Panel (a) of FIG. 9 depicts the base case of paraffin oil without a nanostructure additive. Panel (b) of FIG. 9 depicts paraffin oil with the molybdenum disulfide nanostructures and the emulsifier. It shows the early evidences of molybdenum (Mo)-sulfur (S)-phosphorous (P) in the wear track. Iron (Fe) is seen in panels (a) and (b) of FIG. 9, as it is the material of the balls (52100 steel) in the four-ball test. The molybdenum and sulfur peaks coincide and are not distinguishable because they have the same binding energy. Elemental mapping also showed similar results.

Examples 2-23 are made using a similar method as Example 1, unless specified otherwise.

Example 2

$MoS_2$ (Alfa Aesar, 98% pure, 700 nm average structure size) and canola oil from ADM are used as the starting materials. The $MoS_2$ powder is ball milled for various time conditions, variable ball/powder ratios, and under various ambient conditions, starting with air, canola oil and the subsequent combination of milling in air followed by milling in canola oil. It is also ball milled in different types of organic media. For example, one organic medium that is used is canola oil methyl ester. The processing of this will be similar to the above mentioned example.

Different types of ball milling processes can be used. For instance, in the first step, cryo ball milling in air followed by high temperature ball milling in an organic medium is used.

After the ball milling, the active EP-EA (extreme pressure—environmentally acceptable) structures are treated with phospholipids that have been mixed with a base oil such as paraffin oil.

Example 3

Molybdenum disulphide is ball milled with boron using a ratio of 1 part molybdenum disulphide to 1 part boron. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-boron-canola oil) to 2 parts emulsifier. This is added to the base oil (paraffin oil).

Example 4

Molybdenum disulphide is ball milled with copper using a ratio of 1 part molybdenum disulphide to 1 part metal. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-copper-canola oil) to 2 parts emulsifier. This is added to the base oil (paraffin oil).

Example 5

A molybdenum disulphide/graphite (obtained from Alfa Aesar) mixture in the ratio of 1:1 is ball milled. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-graphite-canola oil) to 2 parts emulsifier. This is added to the base oil paraffin oil).

Example 6

A molybdenum disulphide/boron nitride (Alfa Aesar) mixture in the ratio of 1:1 mixture is ball milled. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-boron nitride-canola oil) to 2 parts emulsifier. This is added to the base oil (paraffin oil).

Example 7

A molybdenum disulphide/graphite/boron nitride mixture in the ratio 1:1:1 is ball milled. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-graphite-boron nitride-canola oil) to 2 parts emulsifier. This is added to the base oil (paraffin oil).

Example 8

A molybdenum disulphide/graphite mixture in the ratio of 1:1:1 is ball milled. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-graphite-boron-canola oil) to 2 parts emulsifier. This is added to the base oil (paraffin oil).

Example 9

A molybdenum disulphide/graphite mixture in the ratio of 1:1 is ball milled with copper using a ratio of 1 part molybdenum disulphide/graphite to 1 part metal. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-graphite-copper-canola oil) to 2 parts emulsifier. This is added to the base oil (paraffin oil).

Example 10

A molybdenum disulphide/boron nitride mixture in the ratio of 1:1 is ball milled with boron using a ratio of 1 part molybdenum disulphide/boron nitride to 1 part metal. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-boron nitride-boron-canola oil) to 2 parts emulsifier. This is added to the base oil (paraffin oil).

Example 11

A molybdenum disulphide/boron nitride mixture in the ratio of 1:1 mixture is ball milled with copper using a ratio of 1 part molybdenum disulphide/boron nitride to 1 part metal. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-boron nitride-copper-canola oil) to 2 parts emulsifier. This is added to the base oil (paraffin oil).

Example 12

A molybdenum disulphide/boron nitride/graphite mixture in the ratio of 1:1:1 is ball milled with boron using a ratio of 1 part molybdenum disulphide/boron nitride/graphite to 1 part metal. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-boron nitride-graphite-boron-Canola oil) to 2 parts emulsifier. This is added to the base oil (paraffin oil).

Example 13

A molybdenum disulphide/boron nitride/graphite in the ratio of 1:1:1 is ball milled with copper using a ratio of 1 part molybdenum disulphide/boron nitride/graphite to 1 part metal. This mixture is then ball milled with vegetable oil (canola oil) using a ratio of 1 part solid lubricant nanostructures to 1.5 parts canola oil. An emulsifier is added using a ratio of 1 part solid lubricant nanostructure composition ($MoS_2$-boron nitride-graphite-copper-canola oil) to 2 parts emulsifier. This is added to the base oil (paraffin oil).

Example 14

Molybdenum disulphide is ball milled with polytetrafluoroethylene (Teflon®) in a ration of 1 part molybdenum disulphide to 1 part Teflon®. This mixture is then added to the base oil (paraffin oil) with a phospholipid emulsifier (soy lecithin).

Example 15

Molybdenum disulphide is ball milled with polytetrafluoroethylene (Teflon®) in a ration of 1 part molybdenum disulphide to 1 part Teflon®. This mixture is then added to the base oil (paraffin oil) with a phospholipid emulsifier (soy lecithin).

Example 16

Molybdenum disulphide is ball milled with metal additives like copper, silver, lead etc. in a ratio of 1 part molybdenum disulphide to 1 part metal additive. This mixture is further ball milled in vegetable oil based esters (canola oil methyl esters) in a ratio of 1 part solid lubricant nanostructures to 1.5 parts esters. An emulsifier is added using a ratio of 1 part solid lubricant nanostructure composition ($MoS_2$-esters) to 2 parts phospholipid emulsifier. This is added to the base oil (paraffin oil).

Example 17

Molybdenum disulphide is ball milled with metal additives like copper, silver, lead etc. in a ratio of 1 part molybdenum disulphide to 1 part metal additive. This mixture is further ball milled in vegetable oil based esters (canola oil methyl esters) in a ratio of 1 part solid lubricant nanostructures to 1.5 parts esters. This is added to the base oil (paraffin oil).

Example 18

Molybdenum disulphide is ball milled. The solid lubricant nanostructures are further ball milled in vegetable oil based esters (canola oil methyl esters) in a ratio of 1 part solid lubricant nanostructures to 1.5 parts esters. An emulsifier is added using a ratio of 1 part solid lubricant nanostructure composition ($MoS_2$-esters) to 2 parts phospholipid emulsifier. This is added to the base oil (paraffin oil).

Example 19

Molybdenum disulphide is ball milled. The solid lubricant nanostructures are further ball milled in vegetable oil based esters (canola oil methyl esters) in a ratio of 1 part solid lubricant nanostructures to 1.5 parts esters. This is added to the base oil (paraffin oil).

Example 20

Molybdenum disulphide is ball milled with metal additives like copper, silver, lead etc. in a ratio of 1 part molybdenum disulphide to 1 part metal additive. This mixture is further ball milled in fatty acids (oleic acid) in a ratio of 1 part solid lubricant nanostructures to 1.5 parts fatty acids. An emulsifier is added using a ratio of 1 part solid lubricant nanostructure composition ($MoS_2$-oleic acid) to 2 parts phospholipid emulsifier. This is added to the base oil (paraffin oil).

Example 21

Molybdenum disulphide is ball milled with metal additives like copper, silver, lead etc. in a ratio of 1 part molybdenum disulphide to 1 part metal additive. This mixture is further ball milled in fatty acids (oleic acid) in a ratio of 1 part solid lubricant nanostructures to 1.5 parts fatty acids. This is added to the base oil (paraffin oil).

Example 22

Molybdenum disulphide is ball milled. The solid lubricant nanostructures are further ball milled in fatty acids (oleic acid) in a ratio of 1 part solid lubricant nanostructures to 1.5 parts fatty acids. An emulsifier is added using a ratio of 1 part solid lubricant nanostructure composition ($MoS_2$-oleic acid) to 2 parts phospholipid emulsifier. This is added to the base oil (paraffin oil).

Example 23

Molybdenum disulphide is ball milled. The solid lubricant nanostructures are further ball milled in fatty acids (oleic acid) in a ratio of 1 part solid lubricant nanostructures to 1.5 parts fatty acids. This is added to the base oil (paraffin oil).

Dielectric Nanolubricant Compositions

As introduced above, the solid lubricant nanostructure composition may comprise a nano-engineered solid lubricant additive that is dispersed in a base. For example, the nano-engineered solid lubricant additive may comprise a plurality of solid lubricant nanostructures having an open-ended architecture and organic, inorganic, or polymeric medium. Lubricant nanostructures may comprise nano-scale macromolecules as described in U.S. patent application Ser. No. 14/816,546, U.S. Pat. No. 9,499,766, and U.S. Pat. No. 8,492,319, and U.S. Provisional Patent Application No. 60/758,307. Some or all of the nanostructures may be intercalated with the organic, inorganic, or polymeric medium. Additionally or alternatively, nanostructures may be encapsulated by the organic, inorganic, or polymeric medium.

The base may include oils, greases, gels, sprays, or a combination thereof. Specific examples of bases may include, but are not limited to, hexane, heptane, mineral spirit, odorless mineral spirit, acetone, hydrocarbon oils, mineral oil, paraffin oils, synthetic oils, petroleum greases, hydrocarbon greases, lithium based greases, fluoroether based greases, silicones, silicone based grease or a combination thereof.

In various embodiments, a composition comprising the nano-engineered solid lubricant additive dispersed in a base may find beneficial application as a dielectric lubricant having nanoscale functionalities. For example, embodiments of the nano-engineered lubricant additive dispersed in base may be applied to object surfaces, such as electrical and electronic components and electrical and electronic contact connections, and thereon provide nanoscale protection and lubrication from electrical interference, voltage leak and corrosion. Such nano-engineered lubricant compositions dispersed in a base may be referred to as dielectric nanolubricant compositions.

According to various embodiments, a dielectric nanolubricant composition comprises nano-engineered lubricant additive intercalated with one or more of an organic, inorganic, or polymeric medium, as described herein, dispersed in base, wherein the base is a grease such as silicone, lithium complex grease, lithium grease, calcium sulfonate grease, silica thickened perfluoropolyether (PFPE) grease, or combinations thereof. In further or additional embodiments, a dielectric nanolubricant composition comprises nano-engineered lubricant additive intercalated with one or more of an organic, inorganic, or polymeric medium, as described herein, dispersed in base, wherein the base is an oil. Example, oils include, but are not limited to, a silicone oil or perfluoropolyether (PFPE) oil, or combinations thereof.

In various embodiments, dielectric nanolubricant compositions include nano-engineered lubricant additives made from starting or feed materials or solid lubricant starting materials identified herein such as polytetrafluoroethylene (PTFE), cerium fluoride, zinc oxide, silica, fluorinated carbon, hexagonal boron nitride, calcium carbonate, calcium fluoride, or a combination thereof. In one example, the solid lubricant nanostructures of the nano-engineered lubricant additive comprise at least one compound selected from calcium carbonate and polytetrafluorethylene (PTFE), or any combination thereof. All or a portion of the nanostructures may include solid lubricant feed mechanically processed, chemically processed, or chemo-mechanically processed to generate the nanostructures. In various embodiments, nano-engineered lubricant additive may comprise solid lubricant feed or solid lubricant nanostructures chemo-mechanically processed with an organic, inorganic, and/or polymeric medium, as described herein.

The solid lubricant structures of the additive may have an average particle dimension of about a few tenths of a micron or less. In some embodiments, solid lubricant nanostructures may have an average particle dimension of less than or equal to about 900 nanometers (0.9 microns), less than or equal to about 500 nanometers (0.5 microns), less than or equal to about 100 nanometers (0.1 microns), less than or equal to about 80 nanometers (0.08 microns), or less than or equal to about 50 nanometers (0.05 microns). In one example, chemo-mechanical processing may result in mechanically processed solid lubricant structures comprising a mixture of solid lubricant nanostructures having an average particle dimension of less than or equal to about 500 nanometers (0.5 microns), such as about 300 nanometers (0.3 microns) or less, such as less than about 100 nanometers (0.1 microns).

As introduced above, the nano-engineered lubricant additive of the dielectric nanolubricant composition may also include an organic, inorganic, and/or polymeric medium associated with the solid lubricant nanostructures. For example, the organic, inorganic, and/or polymeric medium may bond, intercalate, or encapsulate the solid lubricant nanostructures. Example organic, inorganic, and/or polymeric mediums include, but are not limited to, oil mediums, grease mediums, alcohol mediums, or combinations thereof. Specific examples of mediums include, but are not limited to, hexane, heptane, mineral spirit, odorless mineral spirit, acetone, hydrocarbon oils, mineral oil, paraffin oils, synthetic oils, petroleum greases, hydrocarbon greases, lithium based greases, fluoroether based greases, silicones, silicone based grease or a combination thereof.

In some embodiments, excess or unbound organic, inorganic, and/or polymeric medium may have been removed from the solid lubricant nanostructures of the nano-engineered lubricant additive of the dielectric nanolubricant composition, e.g., solid lubricant nanostructures chemo-mechanically processed with organic, inorganic, and/or polymeric medium may be dried to remove excess or unbound medium to produce substantially dry solid lubricant structures and complexes. In specific embodiments, an agent, such as acetone, can be added that dissolves oils that are not a part of a complex, followed by a drying process such as supercritical drying, to produce a substantially dry solid lubricant comprising structures treated by chemo-mechanical processing in an organic medium. The solid lubricant nanostructures in the substantially dry solid lubricant structures and complexes may comprise between 20% and 90%, by weight, of the nano-engineered solid lubricant additive, such as about 25%, about 30%, about 40%, about 50%, about 60%, about 70%, about 80%, or about 90%, by weight.

As noted above, the dielectric nanolubricant composition may include a base comprising a grease, spray, or a combination thereof comprising chemistries such as silicone, calcium sulfonate grease, lithium complex grease, lithium grease, or silica thickened perfluoropolyether (PFPE) grease. For example, the base may comprise silicone, lithium complex grease, lithium grease, calcium sulfonate grease, or silica thickened perfluoropolyether (PFPE) grease alone or in combination with these or other suitable base materials in a carrier spray. In some embodiments, the base may comprise silicone, lithium complex grease, lithium grease, calcium sulfonate grease, silica thickened perfluoropolyether (PFPE) grease or combinations having an NLGI grade between grade #1 and grade #3, such as grade #1 or grade #2.

The dielectric nanolubricant may include any suitable percentage by weight of base. In various embodiments, the dielectric nanolubricant composition comprises a base in an amount between about 10% and about 98%, between about 50% and about 98%, between about 75% and about 98%, between about 90% and about 98%, between about 95% and about 98%, or between about 90% and about 95%, by weight.

The dielectric nanolubricant may include any suitable percentage by weight of nanolubricant additive. In various embodiments, the dielectric nanolubricant composition may comprise from about 0.25% to about 20%, from about 0.5% to about 10%, from about 0.5% to about 5%, or from about 0.75% to about 2% by weight nano-engineered lubricant additive dispersed in the base. In some embodiments, greater amounts by weight of nano-engineered lubricant additive may be dispersed in the base.

In various embodiments, the dielectric nanolubricant composition may also include a carrier medium mixed with the nano-engineered lubricant additive dispersed in base. Example carriers may include a suitable thinner or solvent. In some embodiments, the carrier is selected from organic mediums such as heptane, hexane, mineral spirits, odorless mineral spirit, acetone, naphtha, ethyl acetate, toluene, ethylene glycol, isopropanol alcohol, methanol, ethanol, MEK, or combinations thereof. The amount of carrier may depend on the end user application. In various embodiments, the amount of carrier may be between 0% and 90%, such as between 30% and 90% by weight. In one embodiment, the dielectric nanolubricant composition may be formulated with a brushable or sprayable viscosity to provide uniform film or connector coating and reduce application time. In some applications, the carrier may be selected to evaporate following application, thereafter leaving a protective layer, e.g., film, coating, etc., of lubricant additive dispersed in base along the treated surface. In one embodiment, the dielectric nanolubricant composition includes nano-engineered lubricant additive dispersed in a base comprising a material selected from silicone, lithium complex grease, lithium grease, calcium sulfonate grease, silica thickened perfluoropolyether (PFPE) grease or PFPE oil, or combinations thereof with a carrier comprising a material selected from heptane, hexane, mineral spirits, odorless mineral spirit, acetone, naphtha or combinations thereof. In one example, the composition may be a dielectric nanolubricant grease spray formulated such that the carrier evaporates following application to a treated surface.

Methods of Making a Dielectric Nanolubricant Composition

In various embodiments, a method of making the dielectric nanolubricant composition may include formulating nano-engineered additive comprising organic, inorganic, and/or polymeric, medium intercalating and/or encapsulating solid lubricant nanostructures. In one example, formulating the nano-engineered additive comprises chemo-mechanically milling the solid lubricant nanostructure and the organic, inorganic, and/or polymeric medium wherein the organic, inorganic, and/or polymeric medium intercalates and/or encapsulates the solid lubricant nanostructure.

In various embodiments, a method of making the dielectric nanolubricant composition may include blending nano-engineered additive as described herein with a base to disperse the nano-engineered additive in the base. For example, blending may include addition of nano-engineered lubricant additive to a base such as silicone grease or oil base and mixing. Silicone greases are known in the art and generally include a silicone oil thickened with a thickener. Example silicone oils may include fluorinated silicones, polydimethylsiloxanes (PDMS), polyphenylmethylsilicone, or combinations thereof. Example, thickeners may include amorphous fumed silica, PTFE, mica, carbon black, or combinations thereof. The method may further include addition of a carrier before or during mixing. In one example, between about 0.25% to about 20%, such as about 1%, about 2%, about 5%, about 10%, or about 20% by weight nano-engineered lubricant additive comprising at least one compound selected from polytetrafluorethylene (PTFE), silica, hexagonal boron nitride, calcium carbonate, zinc oxide, or any combination thereof, may be added to between about 80% and about 99%, such as about 90%, about 93%, about 95%, about 97%, or about 99%, by weight, silicone grease (NLGI grade #1 to grade #3). In one example, a Hobart mixer bowl with paddle blade attachment may be used to mix the additive and base. Other mixers, include manual mixing, may be used. Initial mixing may be performed manually to avoid dusting. The mixer may then be set to speed #1, for example, for about 60 minutes. In a further embodiment, a carrier such as heptane or mineral spirits may be added prior to or during mixing for ease of application, e.g., spray application.

Thus milling and blending processes described herein with respect to the dielectric nanolubricant composition may be described as "chemo-mechanical milling and blending". "Chemo-mechanical" is a common term of art related to both chemical and mechanical action. The mechanical aspect of the present inventive process involves the wet and dry milling and blending of the indicated materials, which leads to the chemical aspect of the inventive processes, which includes the formation and interaction of the components to form the indicated macro-molecular structures, by chemical interaction, which may include intercalation, or encapsulation, or chemical bonding, or other bonding.

Evaluation Data

In various embodiments, the dielectric nanolubricant composition may have high tack and adhesion, water resistance to seal with hydrophobic properties, as well as corrosion resistance to form a protective film in and around sensitive electrical connections. The dielectric nanolubricant composition may be formulated to protect from salt corrosion, debris, and electrical leakages and provide thermal management of electrical contacts while providing ease of maintaining low voltage-high current and low voltage-low current contacts. The composition may be further formulated for easy application and be non-curing.

To evaluate the dielectric nanolubricant composition disclosed herein, two example compositions were tested that comprised about 0 to 20% nano-engineered lubricant additive in about 80 to 100% silicone grease by weight. The data generated in the evaluation is presented in the following table.

| Test Method | Dielectric Nanolubricant Composition-1 | Dielectric Nanolubricant Composition-2 |
| --- | --- | --- |
| NLGI Grade | #1-#3 | #1-#3 |
| Thickener Type | Inorganic | Inorganic |
| Color | White | White |
| Texture | Smooth & Tacky | Smooth & Tacky |
| Grease Penetration | 288 | NA |
| ASTM D-2265 Dropping Point, 315° C. | Non-drop | Non-drop |
| ASTM D-4049 Water Spray-off @ 38° C. | 0% removal | 18% removal |
| ASTM D-4048 Copper Corrosion @ 100° C., 24 hrs | 1B | 1B |
| ASTM B117 Salt Fog Corrosion, 27 Days | 1A | NA |
| ASTM D-149 Dielectric Strength, volts/mil | 1290 | 737 |
| ASTM D-97 Pour Point, ° C. | −50 | −50 |
| ASTM D-257 Volume Resistivity, ohm-cm | $3.0 \times 10^{14}$ | $3.0 \times 10^{14}$ |
| ASTM D6184 Oil Separation, 30 hrs @ 100° C. | 0% removed | 0% removed |
| ASTM D217 Low Temperature Penetration at −29° C. | 245 (soft) | 220 (soft) |
| ASTM D217 Low Temperature Penetration at −40° C. | 221 (soft) | 173 (soft) |
| Electrical Connector Resistance Testing After Addition of Grease | No change on resistance | No change on resistance |
| Fire Retardance | Yes | Yes |
| Hydrophobicity (Contact Angle) | 116° | NA |

Certain characteristics of the evaluated dielectric nanolubricant composition reported above were measured in accordance with identified ASTM standard testing protocols, which are each incorporated into the specification in their entirety. Select procedures are discussed in further detail below.

ASTM D2265 (Dropping Point) measures the temperature at which a composition passes from a semi-solid to a liquid state under the conditions of the test. The higher the dropping point, the higher the thermal stability of the grease. ASTM D4049 (Water Spray-off) measures resistance to removal by water. A metal panel is masked and sprayed with dielectric spray grease from a bottle. The solvent is allowed to evaporate and the mask is removed. The panel is weighed and loaded into a spray-off testing unit. After testing, the panel is re-weighed. ASTM D4048 (Copper Corrosion) measures corrosive strength of a material with respect to copper, a strong conductor commonly used in electrical contacts. Polished copper test strips are placed on racks and sprayed with dielectric spray grease. The solvent is allowed to evaporate. The coated strip is then placed in a glass beaker in the oven at the specified temperature for the specified duration. ASTM D6184 (High Temperature Oil Separation) measures separation of base at high temperatures. Grease is placed into a small mesh cup, which is then exposed to a high temperature environment. The amount of base observed to leak through the mesh is measured and reported. ASTM D-97 (Pour Point) tests the lowest temperature in which movement of the sample is observed under test conditions. ASTM D217 (Grease Penetration & Consistency) measures the firmness of grease at certain conditions. The test measures the depth that a standard cone penetrates a sample of the grease under prescribed conditions of weight, time, and temperature (also applicable for low temperature penetration study). The higher the worked penetration number, the lower the NLGI grade, and the lesser the viscosity of the grease. Connection resistance was tested by application to battery terminals. The fitting was disassembled, thoroughly cleaned, and reassembled. Bolts were torqued to 20 N·m. Measured resistance was a steady 0.6Ω. Next, the fitting was again taken apart and reassembled with application of dielectric nanolubricant composition. The measured resistance was a steady 0.5Ω. Hydrophobicity was tested using a water contact angle test and wettability through visual inspection (orb droplets indicate hydrophobic, whereas a flatter spread indicates some hydrophilic properties).

Elastomer compatibility of the dielectric nanolubricant composition was also tested according to ASTM D4289 with requirement of −5-30% in volume change and −15-0 in hardness change. Testing conditions included 70 hours at 100° C. or 150° C. (depending on elastomer types and temperature range). Results of the elastomer compatibility testing of the dielectric nanolubricant compositions are reported below.

| Testing Materials (Elastomers) | Dielectric Nanolubricant Composition (Volume Change/Hardness Change) |
| --- | --- |
| Polycarbonate | Compatible |
| Acrylonitrile Butadiene Styrene (ABS) | Compatible |
| Acrylic | Compatible |
| Polyether ether ketone (PEEK) | No change/No change |
| Polytetrafluoroethylene (PTFE) | No change/No change |
| NYLON | No change/No change |
| Carbon PTFE | No change/No change |
| Nitrile Butadiene Rubber (NBR) | No change/No change |
| Carboxylated Nitrile Butadiene Rubber (XNBR) | No change/−1.0 |
| Hydrogenated Nitrile Butadiene Rubber (HNBR) | No change/−0.6 |
| FKM | No change/No change |
| ETP FKM | No change/No change |
| Ethylene Propylene Diene Monomer (EPDM) | No change/−1.8 |

As the testing results indicate, the dielectric nanolubricant composition disclosed herein delivers multifunctionality at nanoscale for corrosion protection, resistance to lubricant removal under power wash (hydrophobicity), high dielectric strength, wide operating temperatures between about −40° F.

to about +400° F., no environmental degradation along with benefits of non-staining, environmental friendliness, and no to little volume change or hardness change with a variety of elastomers.

Test data evaluating the dielectric nanolubricant composition as disclosed herein has shown that the dielectric nanolubricant composition may have a non-drop rating dropping point. The dielectric nanolubricant composition may have water spray-off of about 0% or between about 0% and about 18% at 38° C. The dielectric nanolubricant composition may have a copper corrosion grade of 1B at 100° C., 24 hrs. The dielectric nanolubricant composition may have a measured oil separation of about 0% at 100° C., 30 hrs. The dielectric nanolubricant composition may have a pour point of about −50° C. The dielectric nanolubricant composition may have a worked penetration number of about 245 or between about 245 and about 220 at −29° C. and about 221 or between about 221 and about 173 at −40° C. The dielectric nanolubricant composition may provide no change in resistance. The dielectric nanolubricant composition may have about a 116° water contact angle. The dielectric nanolubricant composition may be compatible with a wide range of elastomers including polycarbonate, acrylonitrile butadiene styrene (ABS), acrylic, polyether ether ketone (PEEK), polytetrafluoroethylene (PTFE), NYLON, carbon PTFE, nitrile butadiene rubber (NBR), carboxylated nitrile butadiene rubber (XNBR), hydrogenated nitrile butadiene rubber (HNBR), FKM, ETP FKM, and ethylene propylene diene monomer (EPDM).

Methods of Using a Dielectric Nanolubricant Composition

The dielectric nanolubricant composition may be applied to or deposited on surfaces in any suitable manner. For example, the dielectric nanolubricant composition may be applied to or deposited on surfaces using spray, brush, roller, dip, pour, or other suitable techniques. In some embodiments, the dielectric nanolubricant composition may be applied to surfaces to be protected and/or lubricated in a single layer of <1 mm. Notably, thicker or thinner layers or films may also be used. One or more additional layers may also be used. For example, a second layer may be applied on top of the single layer. In one example, <1 mm of dielectric nanolubricant composition may provide a multifunctional protective coating for corrosion protection, high voltage discharge resistance, extreme temperature protection, excellent lubrication, no curing, no staining, environmentally friendly (food grade eligible), and chemical inertness.

Example applications of the dielectric nanolubricant composition may include various connections/electrical connections; battery terminal connections; connections exposed to water, contaminates, or corrosive environments; electrical plugs; mating surfaces or gaskets of multi-pin electrical connections; cable connections; flashlights; chassis SAM; and trailer hitches. The dielectric nanolubricant composition may be a "one-stop-apply" product for electrical protection in assembly/maintenance for not only automotive, trucking, tractors, construction machinery, farming equipment, mining equipment, industrial machinery, business and residential applications but also for aerospace and utilities industries. The dielectric nanolubricant composition may extend electrical component life and save energy by reducing losses, and providing fault tolerance in electrical/mechanical maintenance errors due to extended corrosion and electrical discharge protection without being degraded by harsh environments.

While generally described as beneficial in the protection of electrical systems, the dielectric nanolubricant composition may also find use in other applications, such as in industrial sectors where corrosion protection, lubrication, chemical inertness, or sustainability.

Other Matters

The invention is capable of other embodiments and of being practiced or of being carried out in various ways. Also, it is to be understood that the phraseology and terminology used herein is for the purpose of description and should not be regarded as limiting. This disclosure describes various elements, features, aspects, and advantages of various embodiments, configurations, and arrangements of nanolubricant compositions, such as dielectric nanolubricant compositions, and methods thereof. It is to be understood that certain descriptions of the various embodiments and such configurations and arrangements thereof have been simplified to illustrate only those elements, features and aspects that are relevant to a more clear understanding of the disclosed embodiments, while eliminating, for purposes of brevity or clarity, other elements, features and aspects. Any references to "various," "certain," "some," "one," or "an" when followed by "embodiment," "configuration," or "arrangement" generally means that a particular element, feature or aspect described in the example is included in at least one embodiment. The phrases "in various," "in certain," "in some," "in one," or "in an" when followed by "embodiment", "configuration", or "arrangement" may not necessarily refer to the same embodiment. It is to be understood that those having ordinary skill in the art will recognize that the elements, features, and aspects presented in the example embodiments may be applied in combination with other various combinations and sub-combinations of the elements, features, and aspects presented in the disclosed embodiments. It is to be further appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein, and are not necessary for a complete understanding of the disclosed embodiments, a description of such elements, features, and aspects may not be provided. As such, it is to be understood that the description set forth herein is merely exemplary and illustrative of the disclosed embodiments and is not intended to limit the scope of the invention as defined solely by the claims.

Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

What is claimed is:

1. A dielectric nanolubricant composition, the composition comprising:
a nano-engineered lubricant additive dispersed in a base, wherein the nano-engineered lubricant additive comprises a plurality of solid lubricant nanostructures having an open-ended architecture and a medium selected from an organic medium, inorganic medium, polymeric medium, or combination thereof, wherein the medium intercalates and/or encapsulates the nanostructures, wherein the base comprises a grease or oil, and wherein the composition is dielectric.

2. The composition of claim 1, wherein at least a portion of the nanostructures have an average particle dimension of about a few tenths of a micron or less.

3. The composition of claim 1, wherein the nanostructures comprise a material selected from the group consisting of polytetrafluoroethylene (PTFE), cerium fluoride, zinc oxide, silica, fluorinated carbon, hexagonal boron nitride, calcium carbonate, calcium fluoride, zirconium oxide, and combinations thereof.

4. The composition of claim 1, wherein the nanostructures comprise a material selected from the group consisting of hexagonal boron nitride, polytetrafluorethylene (PTFE), calcium carbonate, zirconium oxide, and combinations thereof.

5. The composition of claim 1, wherein the nanostructures comprise calcium fluoride or zirconium oxide.

6. The composition of claim 1, wherein the base comprises at least one of a silicone oil, silicone grease, lithium complex grease, lithium grease, calcium sulfonate grease, silica thickened perfluoropolyether (PFPE) grease, or perfluoropolyether (PFPE) oil.

7. The composition of claim 1, wherein the nanostructures comprise polytetrafluoroethylene (PTFE), calcium carbonate, silica, or zirconium oxide.

8. The composition of claim 1, wherein the organic and/or inorganic and/or polymeric medium comprises at least one material selected from the group consisting of hexane, heptane, mineral spirit, odorless mineral spirit, acetone, hydrocarbon oils, mineral oil, paraffin oils, synthetic oils, petroleum greases, hydrocarbon greases, lithium based greases, fluoroether based greases, silicones, silicone based grease or a combination thereof.

9. The composition of claim 1, wherein the composition comprises the nano-engineered lubricant additive in an amount of 20% by weight or less.

10. The composition of claim 1, further comprising an organic and/or inorganic medium for dispensing.

11. The composition of claim 10, wherein the organic and/or inorganic medium comprises at least one of heptane, hexane, mineral spirits, odorless mineral spirit, acetone, naphtha, ethyl acetate, toluene, ethylene glycol, isopropanol alcohol, methanol, ethanol, or MEK.

12. The composition of claim 11, wherein the composition is in a form of a spray coating.

13. The composition of claim 1, wherein the composition is in a form of a gel.

14. The composition of claim 1, wherein the composition has an NLGI grade from #1 to #3.

15. The composition of claim 1, wherein the composition comprises from between 10% to 95% by weight of organic and/or inorganic greases comprising silicone based grease, lithium complex grease, lithium grease, silica based perfluoropolyether (PFPE) grease, or calcium sulfonate grease.

16. A method of making a dielectric nanolubricant composition, the method comprising:
formulating a nano-engineered lubricant additive comprising:
chemo-mechanical milling a solid lubricant feed and a medium selected from an organic medium, inorganic medium, polymeric medium, or combination thereof to produce a plurality of solid lubricant nanostructures having an open-ended architecture, wherein the medium intercalates and/or encapsulates the nanostructures; and
blending the nano-engineered lubricant additive with a base to disperse the nano-engineered lubricant additive in the base, wherein the base comprises a grease or oil, and wherein the composition is dielectric.

17. The method of claim 16, wherein at least a portion of the nanostructures have an average particle dimension of about a few tenths of a micron or less.

18. The method of claim 16, wherein the nanostructures comprise a material selected from the group consisting of polytetrafluoroethylene (PTFE), cerium fluoride, zinc oxide, silica, fluorinated carbon, hexagonal boron nitride, calcium carbonate, calcium fluoride, zirconium oxide, and combinations thereof.

19. The method of claim 16, wherein the nanostructures comprise a material selected from the group consisting of hexagonal boron nitride, polytetrafluorethylene (PTFE), calcium carbonate, zirconium oxide, and combinations thereof.

20. The method of claim 16, wherein the nanostructures comprise calcium fluoride or zirconium oxide.

21. The method of claim 16, wherein the base comprises at least one of a silicone oil, silicone grease, lithium complex grease, lithium grease, calcium sulfonate grease, silica thickened perfluoropolyether (PFPE) grease, or perfluoropolyether (PFPE) oil.

22. The method of claim 16, wherein the nanostructures comprise polytetrafluoroethylene (PTFE), calcium carbonate, silica, or zirconium oxide.

23. The method of claim 16, wherein the organic and/or inorganic and/or polymeric medium comprises at least one material selected from the group consisting of hexane, heptane, mineral spirit, odorless mineral spirit, acetone, hydrocarbon oils, mineral oil, paraffin oils, synthetic oils, petroleum greases, hydrocarbon greases, lithium based greases, fluoroether based greases, silicones, silicone based grease or a combination thereof.

24. The method of claim 16, wherein the composition comprises the nano-engineered lubricant additive in an amount of 20% by weight or less.

25. The method of claim 16, further comprising an organic and/or inorganic medium for dispensing.

26. The method of claim 25, wherein the organic and/or inorganic medium comprises at least one of heptane, hexane, mineral spirits, odorless mineral spirit, acetone, naphtha, ethyl acetate, toluene, ethylene glycol, isopropanol alcohol, methanol, ethanol, or MEK.

27. The method of claim 26, wherein the composition is in a form of a spray coating.

28. The method of claim 16, wherein the composition is in a form of a gel.

29. The method of claim 16, wherein the composition has an NLGI grade from #1 to #3.

30. The method of claim 16, wherein the composition comprises from between 10% to 95% by weight of organic and/or inorganic greases comprising silicone based grease, lithium complex grease, lithium grease, silica based perfluoropolyether (PFPE) grease, or calcium sulfonate grease.

* * * * *